United States Patent
Oota et al.

(10) Patent No.: US 10,044,933 B2
(45) Date of Patent: Aug. 7, 2018

(54) PERIPHERY MONITORING DEVICE FOR WORK MACHINE

(71) Applicant: Hitachi Construction Machinery Co., Ltd., Tokyo (JP)

(72) Inventors: Moritaka Oota, Abiko (JP); Yoichi Kowatari, Kasumigaura (JP); Yoshihiro Inanobe, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 138 days.

(21) Appl. No.: 14/913,695

(22) PCT Filed: Feb. 26, 2015

(86) PCT No.: PCT/JP2015/055668
§ 371 (c)(1),
(2) Date: Feb. 23, 2016

(87) PCT Pub. No.: WO2015/133367
PCT Pub. Date: Sep. 11, 2015

(65) Prior Publication Data
US 2016/0205319 A1    Jul. 14, 2016

(30) Foreign Application Priority Data
Mar. 7, 2014  (JP) .................................. 2014-045075

(51) Int. Cl.
*H04N 7/00*     (2011.01)
*H04N 5/232*    (2006.01)
(Continued)

(52) U.S. Cl.
CPC ......... *H04N 5/23238* (2013.01); *E02F 9/261* (2013.01); *G06K 9/20* (2013.01);
(Continued)

(58) Field of Classification Search
CPC .... H04N 5/247; H04N 5/23238; G06T 11/60; G06T 7/0004; G06T 3/4038; E02F 9/261
(Continued)

(56) References Cited

U.S. PATENT DOCUMENTS 9,558,556 B2 * 1/2017 Fukata ............... G06K 9/00791
2011/0026771 A1  2/2011 Hsu et al.
(Continued)

FOREIGN PATENT DOCUMENTS

EP           1303140 A1 *  4/2003  ............... B60R 1/00
JP         2010-147523 A   7/2010
(Continued)

OTHER PUBLICATIONS

International Search Report of PCT/JP2015/055668.

*Primary Examiner* — Thai Tran
*Assistant Examiner* — Jose Mesa
(74) *Attorney, Agent, or Firm* — Mattingly & Malur, PC

(57) ABSTRACT

A periphery monitoring device for a work machine includes imaging devices that capture an image of the surroundings of the work machine. An overhead view image is generated from the surroundings of the work machine based upon upper view-point images of the image devices. When generating an overhead view image of an overlap region of first and second upper view-point images relating to the images captured by the first and second imaging devices, the overhead view image generating unit, based upon a height of a virtual monitoring target, sets at least one of a first region in which the first upper view-point image is displayed and a second region in which the second upper view-point image is displayed, and also sets a third region in which a composite display image based upon the first and second upper view-point images is displayed.

5 Claims, 22 Drawing Sheets

(51) Int. Cl.
  *G06K 9/20* (2006.01)
  *G06T 7/00* (2017.01)
  *G06T 11/60* (2006.01)
  *H04N 5/247* (2006.01)
  *E02F 9/26* (2006.01)
  *G06T 3/40* (2006.01)

(52) U.S. Cl.
  CPC .......... *G06T 3/4038* (2013.01); *G06T 7/0004* (2013.01); *G06T 11/60* (2013.01); *H04N 5/247* (2013.01); *G06K 2009/2045* (2013.01); *G06T 2207/30252* (2013.01)

(58) Field of Classification Search
  USPC .......................................................... 348/38
  See application file for complete search history.

(56) References Cited

U.S. PATENT DOCUMENTS

| | | |
|---|---|---|
| 2012/0069153 A1 | 3/2012 | Mochizuki et al. |
| 2013/0033494 A1 | 2/2013 | Kiyota |
| 2013/0155241 A1 | 6/2013 | Tanuki et al. |

FOREIGN PATENT DOCUMENTS

| | | |
|---|---|---|
| JP | 2011-221865 A | 11/2011 |
| JP | 4934308 B2 | 5/2012 |
| JP | 2012-109741 A | 6/2012 |
| JP | 2012-254650 A | 12/2012 |
| WO | 2010/116801 A1 | 10/2010 |
| WO | 2010/137265 A1 | 12/2010 |

\* cited by examiner

N = nh / (H−h)

PERIPHERY MONITORING DEVICE FOR WORK MACHINE

TECHNICAL FIELD

The present invention relates to a periphery monitoring device for a work machine (working machine) that composes an overhead view image (a bird's eye view image) from a plurality of images captured by a plurality of cameras that are mounted upon the work machine, and that performs monitoring of the surroundings of the work machine by using this overhead view image.

BACKGROUND ART

In the prior art, an operation support system is per se known (for example, refer to Patent Document #1) that employs an image generation device that converts images respectively captured by a plurality of cameras that capture images of the surroundings of a work machine into overhead view images, and that joins together neighboring ones of those overhead view images in the form of a grid, thereby preventing the disappearance of objects having a certain height that might otherwise disappear in the combined portion, and moreover whose contrast is not conspicuous due to a glid shape applying same color illusion.

CITATION LIST

Patent Literature

Patent Document #1: Japanese Laid-Open Patent Publication No. 2012-109741.

SUMMARY OF THE INVENTION

Technical Problem

However, in the overhead view image, the image of a tridimensional object becomes an image that is, so to speak, collapsed or lying down along the imaging direction of the camera. Due to this, when a combination image is displayed as described in Patent Document #1, since the direction of collapse of the image is different for each camera, accordingly two collapsed images are displayed even though only one tridimensional object is present. Due to this, it appears though two bodies are present, and this is not desirable. Moreover, since the images captured by two cameras are combined alternatingly, accordingly the amount of information for the object that is captured (the number of pixels) is undesirably reduced to half or at least lowered, so that the object becomes a semi-transparent image. Due to these facts, the problem arises that it is difficult for the operator to distinguish the target that is being monitored.

Solution to Problem

According to the first aspect of the present invention, a periphery monitoring device for a work machine, comprises: a plurality of imaging devices that each captures an image of surroundings of the work machine; an overhead view image generating unit that converts the image captured by each of the plurality of imaging devices into an upper view-point image, and generates an overhead view image of the surroundings of the work machine based upon upper view-point images; and a display unit that displays the is overhead view image in an overhead view image display region, wherein: when generating an overhead view image of an overlap region of a first upper view-point image relating to the image captured by a first imaging device included in the plurality of imaging devices and a second upper view-point image relating to the image captured by a second imaging device included in the plurality of imaging devices: the overhead view image generating unit, based upon a height of a virtual monitoring target, sets at least one of a first region in which the first upper view-point image is displayed and a second region in which the second upper view-point image is displayed, and also sets a third region in which a composite display image based upon the first and second upper view-point images is displayed.

Advantegous Effect of the Invention

According to the present invention, in the overlapping region, it is possible to make the combination image display region narrower than in the prior art, and it is possible to provide a periphery monitoring device that is excellent at monitoring periphery situation and at providing excellent visibility.

DESCRIPTION OF EMBODIMENTS

Figure 1:
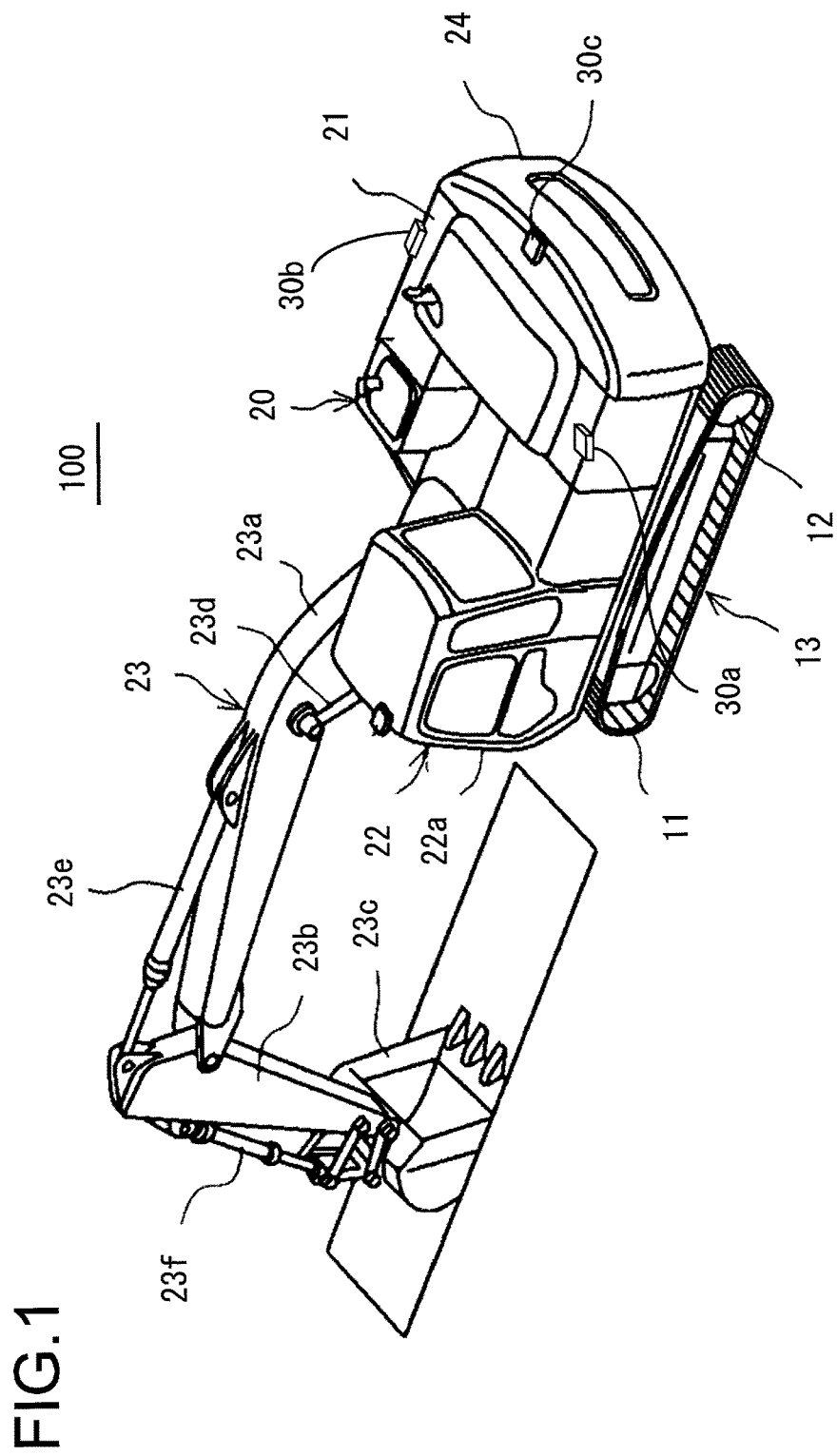
FIG. 1 is a figure showing a work machine (a hydraulic excavator 100) to which a periphery monitoring device according to the present invention is mounted.

In the following, an embodiment of the present invention will be explained with reference to the drawings. FIG. 1 is a figure showing a work machine to which a periphery monitoring device according to the present invention is mounted, and is an overall perspective view of a hydraulic excavator 100. This hydraulic excavator 100 principally comprises a lower traveling unit 13 and an upper pivoting unit 20 that is provided upon the lower traveling unit 13 so as to pivot freely.

The lower traveling unit 13 includes a pair of crawlers 11, 11 that are positioned upon a traveling unit frame so as to be parallel to one another, and a hydraulically powered traveling motor 12 is provided to each of these crawlers 11, 11 for driving its crawler track and thereby propelling the hydraulic excavator.

The upper pivoting unit 20 principally comprises: an engine compartment 21 that is installed upon a pivoting chassis not shown in the figures and that houses equipment of various types such as an engine, a battery, a fuel tank, and so on; a driving compartment 22 that is provided on the left side in front of this engine compartment 21; a front work machine 23 that extends from the right side of this driving compartment 22 forward; and a counterweight 24 that is provided behind the engine compartment 21 with a view to balancing the weight of this front work machine 23.

As well as operation levers for operating the front work machine 23 and instruments and so on being installed within a cabin 22a in which the operator rides, a periphery observation monitor that will be described hereinafter is installed in the driving compartment 22. The front work machine 23 principally comprises a boom 23a that extends forward from the pivoting chassis side, an arm 23b that is pivotally provided at the end of this boom 23a, and a bucket 23c that is swingably provided at the end of this arm 23b. These boom 23a, arm 23b, and bucket 23c are adapted to be respectively operated by a boom cylinder 23d, an arm cylinder 23e, and a bucket cylinder 23f, each of which can be hydraulically extended and retracted.

Cameras 30a, 30b, and 30c for capturing continuously in various directions are installed on both sides of the engine compartment 21 and on the upper portion of the counterweight 24. The camera 30a continuously captures the region on the left side of the upper pivoting unit 20 with a 180° angle of view, and is positioned so as to look slopingly downwards. And the camera 30b continuously captures the region on the right side of the upper pivoting unit 20 with a 180° angle of view, and is positioned so as to look slopingly downwards. Moreover, the camera 30c continuously captures the region behind the upper pivoting unit 20 with a 180° angle of view, and is positioned so as to look slopingly downwards.

The cameras 30a, 30b, and 30c are built as wide angle video cameras or the like, and are equipped with CCD or CMOS imaging elements or the like which are excellent from the points of view of durability and weather resistance, and with wide angle lenses. It should be understood that, in the following explanation, the portion of the upper pivoting unit 20 to which these cameras 30a, 30b, and 30c are mounted will be termed the "vehicle body 20".

Figure 2:
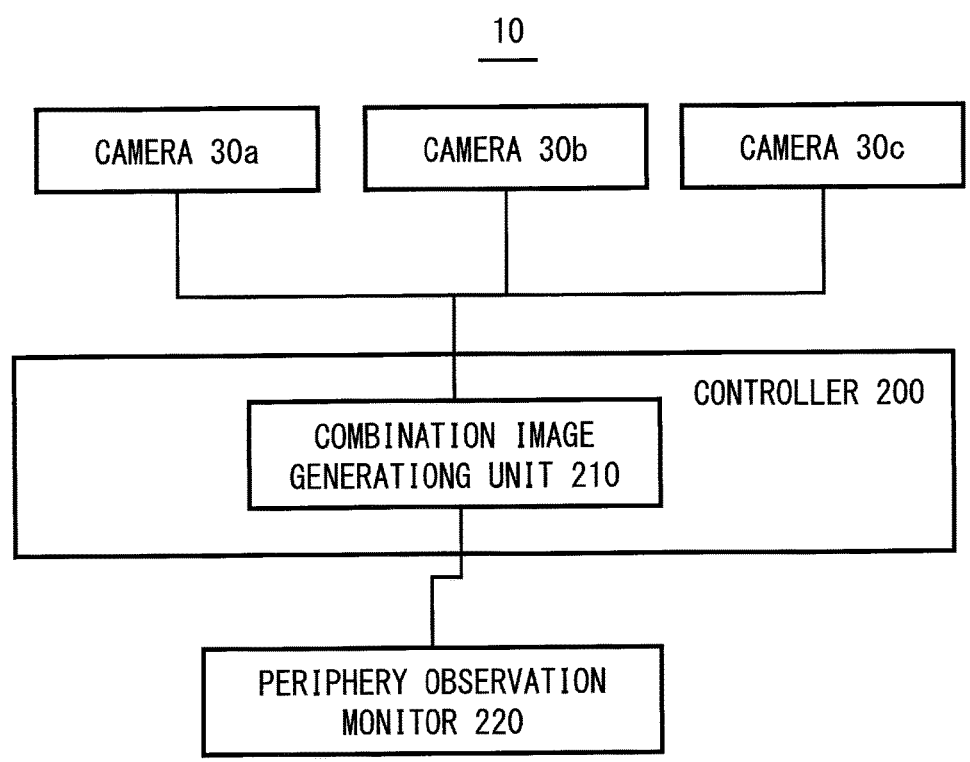
FIG. 2 is a block diagram showing the structure of this periphery monitoring device 10 that is mounted to the hydraulic excavator 100.

FIG. 2 is a block diagram showing the structure of a periphery monitoring device 10 that is mounted to this hydraulic excavator 100. This periphery monitoring device 10 principally comprises a controller 200, the cameras 30a, 30b, and 30c, and a periphery observation monitor 220. The controller 200 comprises a combination image generating unit 210. The images captured by the cameras 30a, 30b, and 30c (the original captured images) are all inputted to the combination image generating unit 210 of the controller 200. This combination image generating unit 210 is built from image processing LSI (hardware) comprising a CPU, RAM, ROM, input and output interfaces, and so on, none of which are shown in the figures, and the CPU is adapted to implement the functions of the combination image generating unit 210 described above by various types of data and a dedicated image processing program stored in advance in the ROM and so on.

From the plurality of original images (three thereof) captured by the cameras 30a, 30b, and 30c, the combination image generating unit 210 generates an upper view-point image at, for example, 30 frames per second, and outputs this upper view-point image that it generates (which is a video image). In concrete terms, each of composite signal in NTSC format or the like of the original images is inputted from the cameras 30a, 30b, and 30c, and, after having performed A/D conversion upon these composite signals and having decoded them into RGB signals, the combination image generating unit 210 stores them all in respective dedicated frame memories. And subsequently, after having performed lens distortion correction processing, by performing per se known image conversion processing such as planar projective transformation processing with a homography matrix or projection processing in three dimensional space and so on, the combination image generating unit 210 performs processing to convert each of the original images into an upper view-point image by shifting a view point to overhead.

Figure 3:
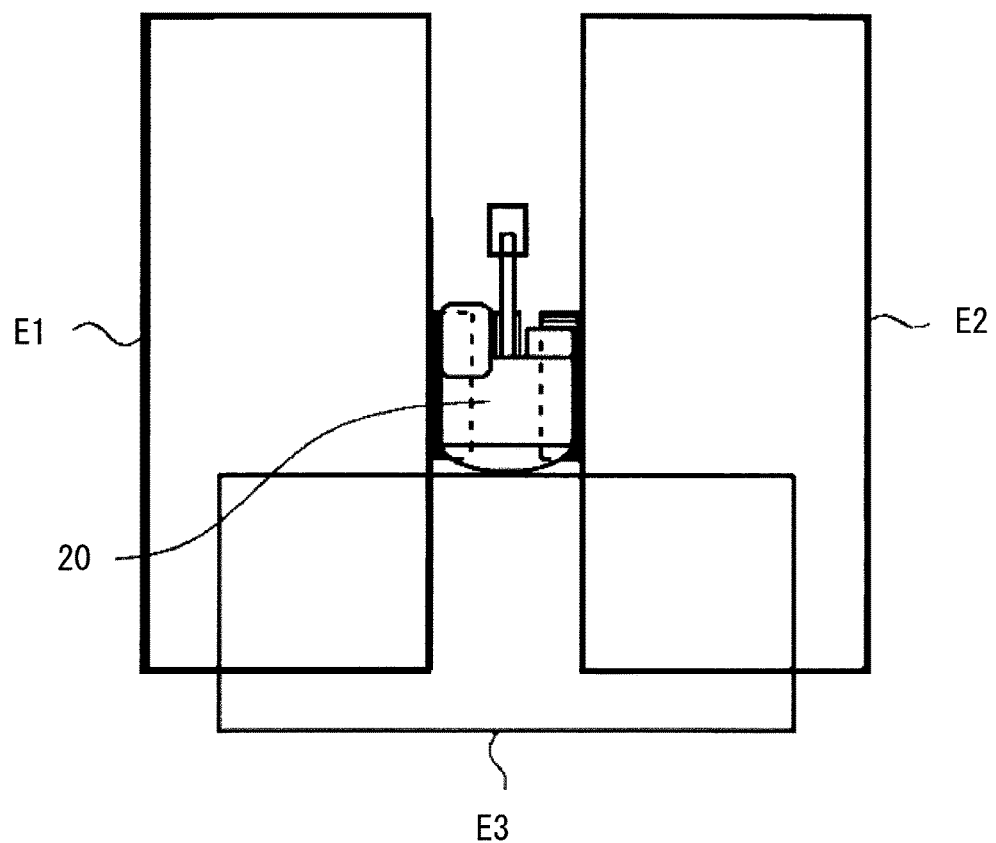
FIG. 3 is a figure showing regions that can be captured by cameras 30a, 30b, and 30c that are provided to the vehicle body 20.

FIG. 3 is a figure showing the regions that can be captured by the cameras 30a, 30b, and 30c that are provided to the vehicle body 20, and is a figure showing the vehicle body 20 and its surrounding region in an overhead view from above the vehicle body 20. The rectangular area E1 on the left side of the vehicle body is the region that can be captured by the camera 30a. The rectangular area E2 on the right side of the vehicle body is the region that can be captured by the camera 30b. And the rectangular area E3 to the rear of the vehicle body is the region that can be captured by the camera 30c.

The rear end part of the rectangular area E1 and the left end part of the rectangular area E3 overlap one another, and this overlapped region is captured in duplicate by both the camera 30a and the camera 30c. Moreover, the rear end part of the rectangular area E2 and the right end part of the rectangular area E3 overlap one another, and this overlapped region is captured in duplicate by both the camera 30b and the camera 30c.

Figure 4:
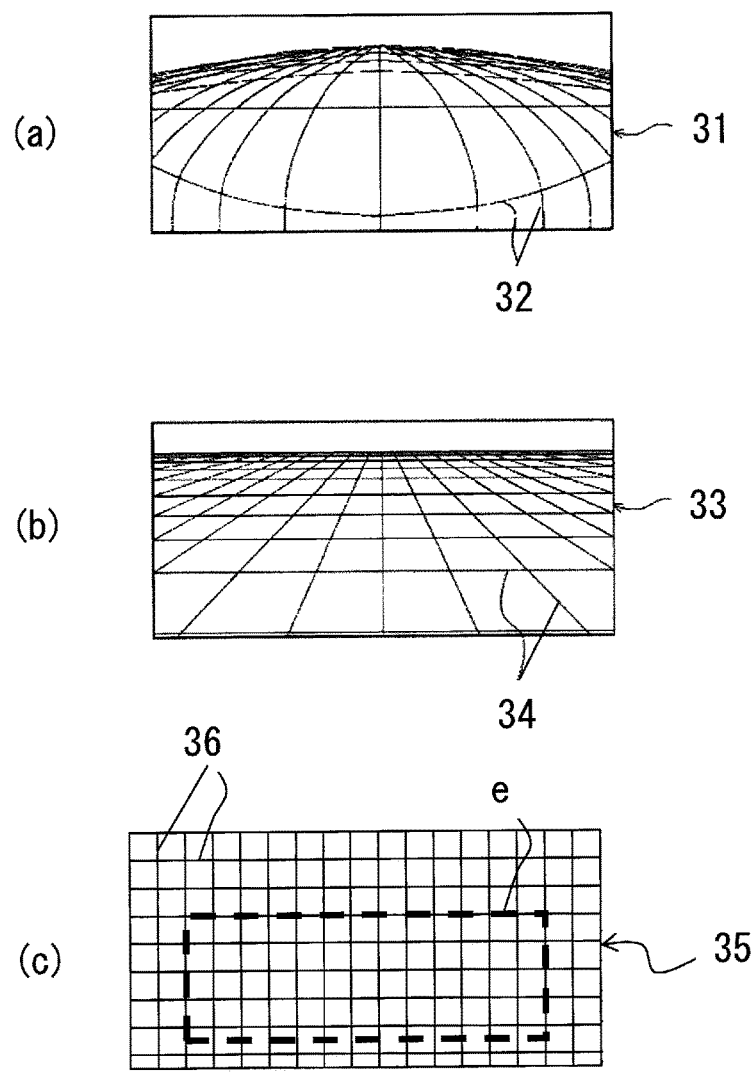
FIG. 4 is a figure for explanation of conversion processing to produce an upper view-point image performed by a combination image generating unit 210.

FIG. 4 is a figure for explanation of the conversion processing to produce the upper view-point image performed by the combination image generating unit 210. FIG. 4(a) shows an example of an original image 31 of one of the rectangular areas E1, E2, and E3 that have been captured by the cameras 30a, 30b, and 30c. Since each of the cameras 30a, 30b, and 30c performs capturing with a wide angle lens whose angle of view from left to right is about 180°, accordingly the original image 31 that has been captured is distorted so that its central portion is magnified while its peripheral portions are shrunk down, as generally shown by the grid lines 32.

Lens distortion correction processing is performed upon the original image 31 by the combination image generating unit 210. FIG. 4(b) shows the corrected image 33 after this lens distortion correction processing. This corrected image 33 after correction processing is corrected to a format according to the perspective of the points of view of the camera 30a, 30b, or 30c, as shown by the vertical and horizontal virtual coordinate lines 34 upon the ground surface (upon the road surface). It should be understood that this lens distortion correction processing may, for example, be performed by pixel coordinate conversion using a dedicated pixel conversion table that is stored in the memory in advance, in other words a pixel conversion table in which a correspondence relationship is described between the addresses of the pixels that make up the image before conversion and the addresses of the pixels after conversion.

The combination image generating unit 210 further performs point of view conversion processing upon the corrected image after lens distortion correction processing, so as to shift its point of view to directly above the vehicle body. FIG. 4(c) is a figure showing the resulting upper view-point image 35 after this point of view conversion processing. The virtual coordinate lines 34 in the corrected image 33 of FIG. 4(b) are converted into the virtual orthogonal coordinate lines 36, which intersect one another orthogonally in the form of a grid. It should be understood that this point of view conversion processing is also performed by pixel coordinate conversion using a dedicated pixel conversion table (a conversion table for point of view conversion processing) that is stored in the memory in advance.

Figure 22:
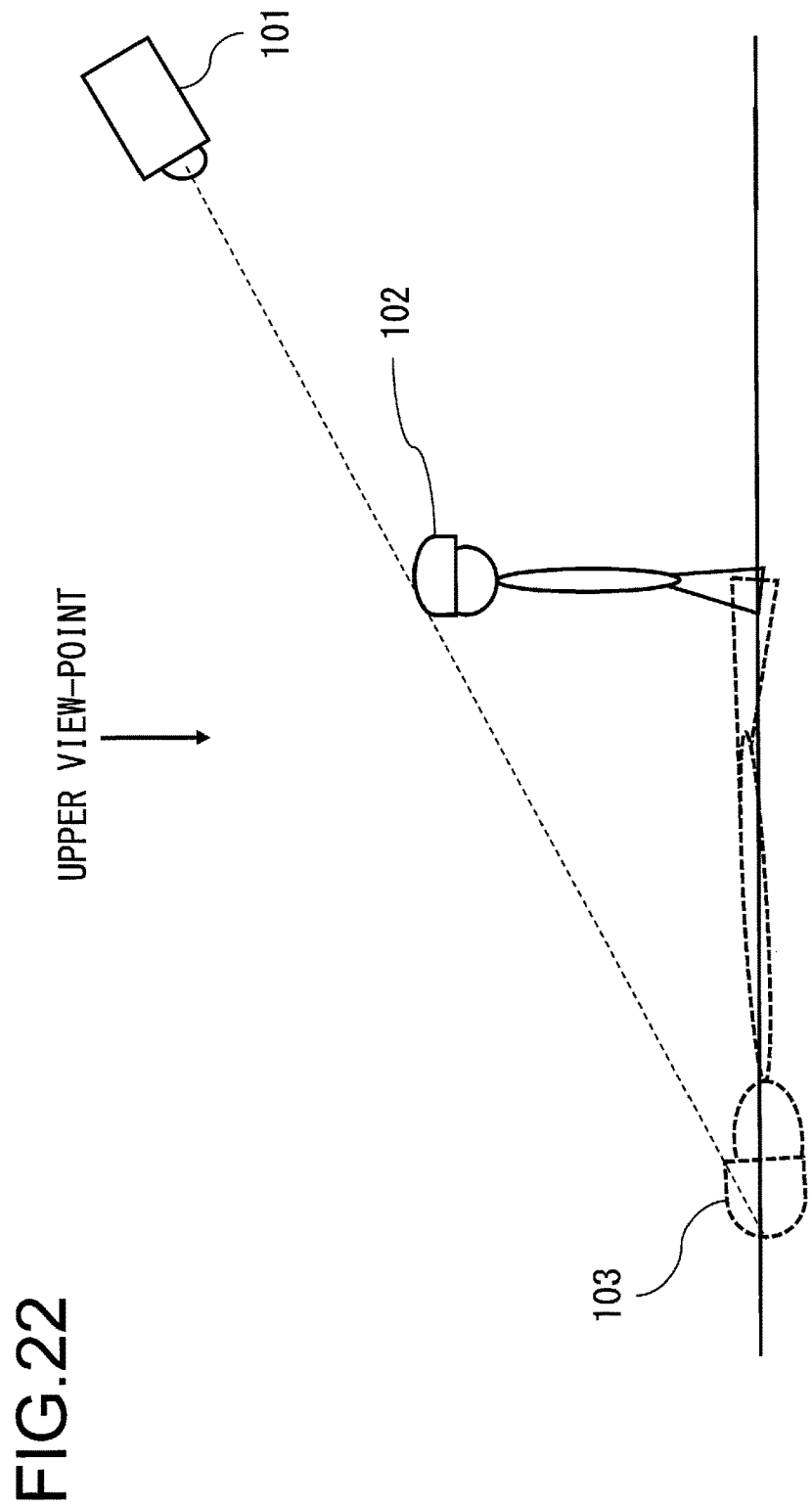
FIG. 22 is a figure for explanation of an upper view-point image (an overhead view image).

FIG. 22 is a figure for explanation of the upper view-point image (i.e., this overhead view image). A point of view conversion technique that obtains an image by performing image processing upon an image captured by a camera that is mounted in the surroundings of the work machine and thereby changing the position of the point of view to a virtual upper view-point is per se known, and, in this point of view conversion, a correspondence between the actual camera image and a virtual camera image with respect to a reference plane for the point of view conversion is established. When the virtual points of view of a plurality of images captured by a plurality of cameras are all brought to the same position at this point of view conversion technique is performed, the user is enabled to understand the displayed image more easily, since when the plurality of images are lined up for display they are displayed as though they were a single image captured by a single camera from the same point of view.

FIG. 22 shows that, a tridimensional target of a person 102 is captured by a camera 101, and, when the resulting captured image is converted to an upper view-point image, it becomes the image shown by the reference symbol 103. In other words, the captured image of the person 102 is converted into the image 103 (hereinafter termed a "collapsed image") so that the image deformed by being elongated along the line joining the camera 101 and the person 102 and by being projected upon the surface of the ground.

Returning to FIG. 4, the combination image generating unit 210 cuts out the images to be actually displayed from each of the upper view-point images 35 that have been generated, and generates an overhead view image (a moving video image) of the surroundings centered upon the vehicle body 20 by combining the three images that have thus been cut out. The rectangular region e in FIG. 4(c) surrounded by the broken line shows the region that is cut out from this upper view-point image 35.

Figure 5:
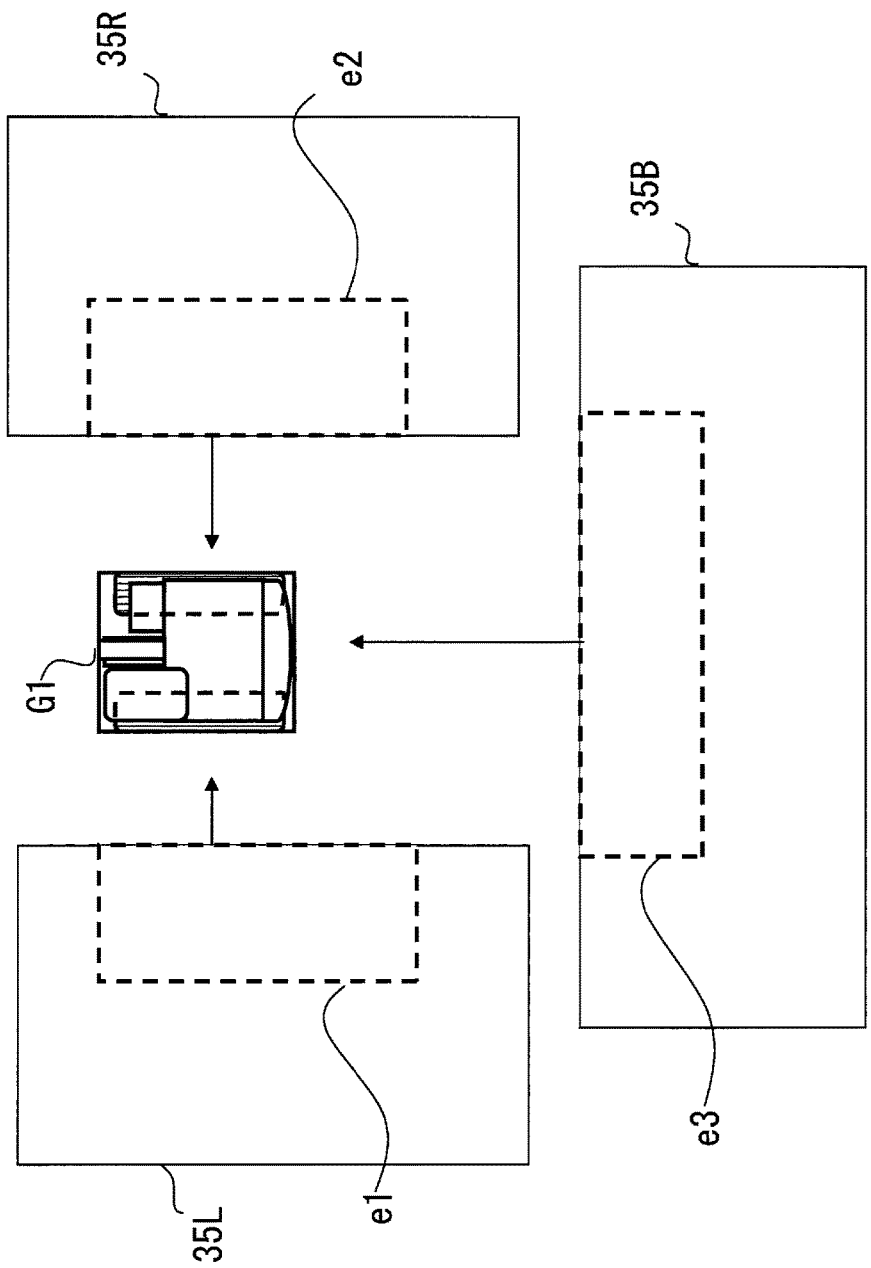
FIG. 5 is a figure for explanation of cutting out display images e1 through e3.

As shown in FIG. 5, the combination image generating unit 210 cuts out respective display images e1 through e3 from the three upper view-point images 35L, 35R, and 35B that correspond to the rectangular areas E1, E2, and E3. And the combination image generating unit 210 joins together these display images e1 through e3 to surround the image G1 that corresponds to the vehicle body 20, thereby generating a single io continuous overhead view image 300 as shown in FIG. 6, image data for which is then outputted to the frame memory.

Figure 6:
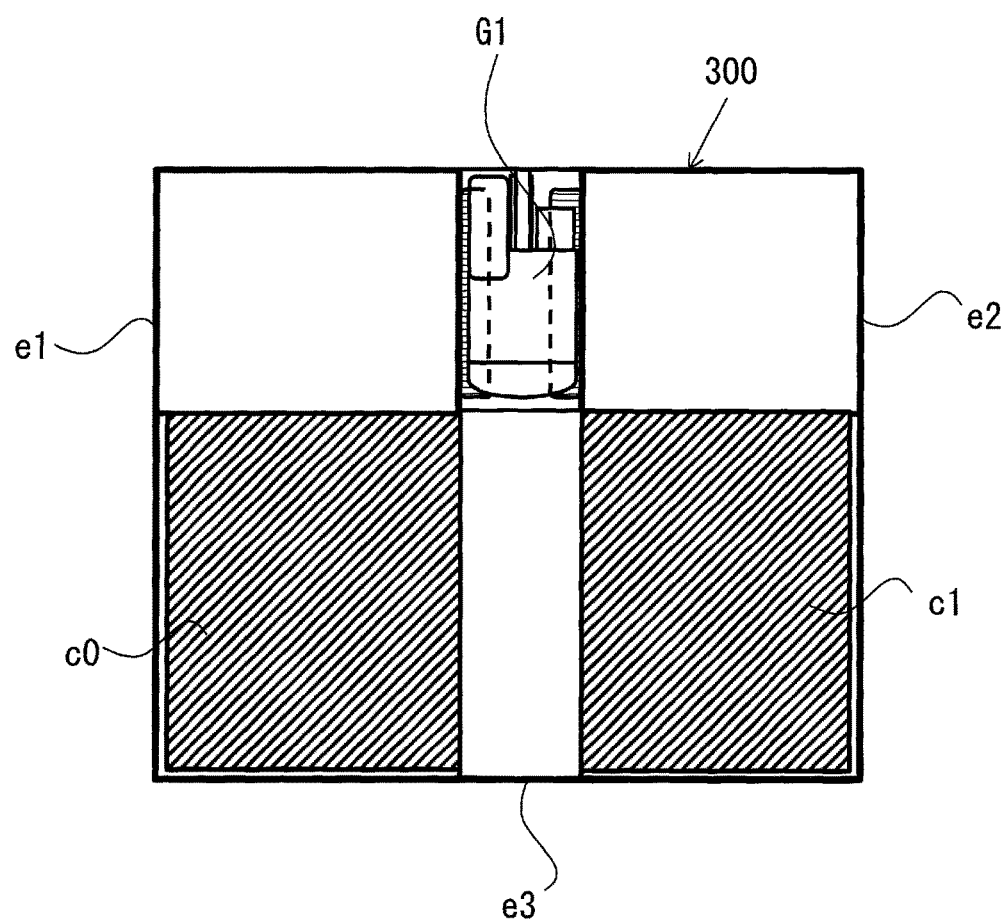
FIG. 6 is a figure showing these display images e1 through e3 and overlapped regions c0 and c1 in an overhead view image 300.

In FIG. 6, the region c0 shown by hatching is the region where the display image e1 and the display image e3 overlap one another. Moreover, the region c1 shown by hatching is the region where the display image e2 and the display image e3 overlap one another. It should be understood that although, for ease of understanding, in FIG. 6 a gap is shown as being opened up between the frame that delimits the display image e3 and the frames that delimit the overlapped regions c0 and c1, actually gaps of this type do not really occur.

In the overlapped region c0, the display image e1 that is based upon the image captured by the camera 30a and the display image e3 that is based upon the image captured by the camera 30c are both present. In a similar manner, in the overlapped region c1, the display image e2 that is based upon the image captured by the camera 30b and the display image e3 that is based upon the image captured by the camera 30c are both present.

Figure 7:
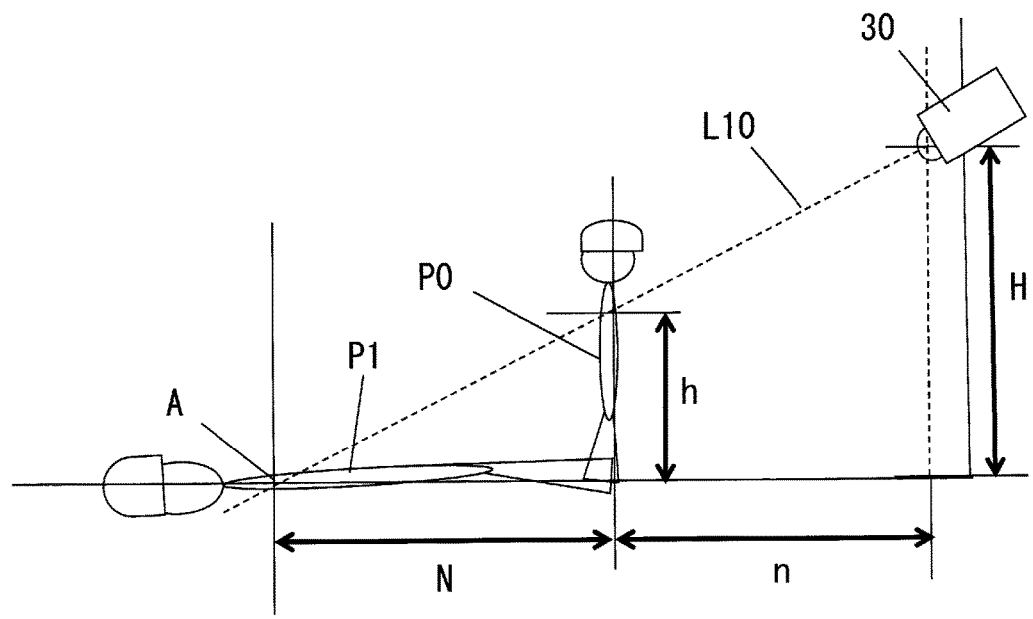
FIG. 7 is a figure for explanation of a collapsed length N.

Now, using FIG. 7, the size of collapsed images in the display images e1 through e3, which are upper view-point images, will be explained. Let the height at which the cameras 30 (30a, 30b, and 30c) are mounted upon the vehicle body 20 (the camera mounting height) be H, and let the height of the target being monitored be h. FIG. 7 illustrates a case in which the target being monitored is a person, and the height of this person's body is shown as h. Generally, the main factor in setting the height h of the target being monitored is what type of object is taken as being the target to be monitored. For example, if a person or a vehicle or the like is taken as the main target to be monitored, then, supposing that the height of a typical person is 1.7 m, the height h of the target being monitored is set to 1.5 m, so as to be able to display this person up to around breast height.

In FIG. 7, n is the distance from the camera 30 to the target being monitored. The point A is the point where the straight line L10 and the surface of the ground intersect. It should be understood that the straight line L10 is the straight line that connects the center of the camera 30 (the point of intersection of its imaging element and its optical axis) and the breast of the tridimensional object (the person) having the height h of the target being monitored. When the image of the tridimensional object P0 (a person) that has been captured by the camera 30 is converted to an upper view-point, this upper view-point image of the tridimensional object P0 is displayed as the image P1. This image appears as though a tridimensional object P0 of height N has collapsed and is lying down upon the ground surface. In the following, the point A is termed the "position of collapse" of the tridimensional object P0, and the distance N from the position of the tridimensional object P0 (its position upon the ground surface) to the point A is termed its "collapsed length". Moreover, the image P1 displayed upon the display screen is termed a "collapsed image".

The collapsed length N can be calculated according to the calculation equation "N=n·h/(H−h)" shown in FIG. 7. For example, if H=2.0 m, h=1.5 m, and n=3.0 m, then the collapsed length N becomes 9.0 m.

Figure 8:
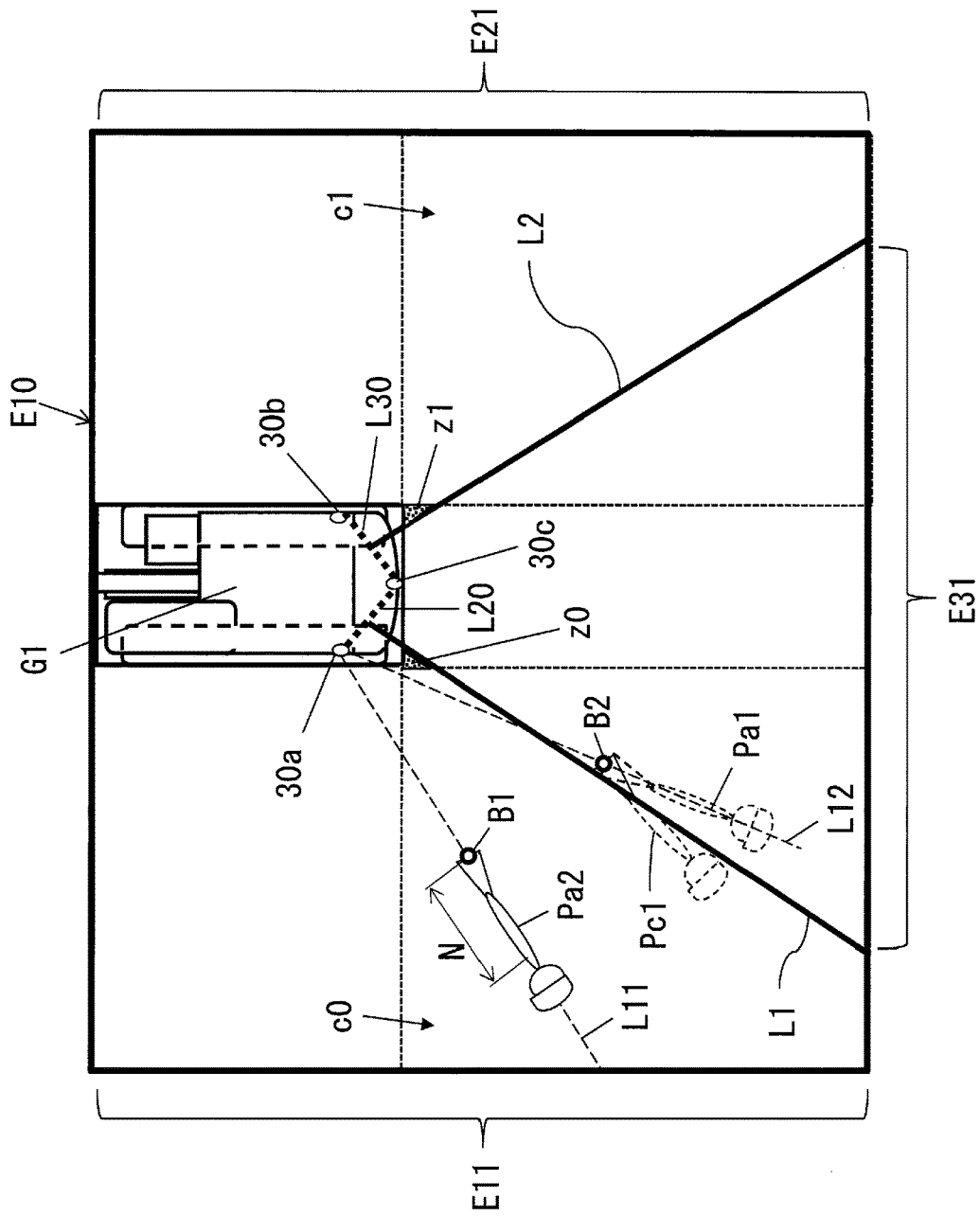
FIG. 8 is a figure for explanation of region setting lines L1 and L2 and disappearance of an image.

Since, as described above, two different display images are respectively present in the overlapped regions c0 and c1, accordingly it is possible to adopt various different types of display format using these two different display images, and, with the prior art technique described above, the disappearance of the image of the tridimensional object in the neighborhood of the boundaries between the display images e1, e2, and e3 (in the neighborhood of the boundaries of the overlapped regions) is prevented by displaying the two different display images simultaneously as overlapped images arranged upon a grid. However, if two images related to the same object are displayed at the same time, then, when the display region in which this simultaneous display is provided is wide, the number of tridimensional objects becomes great. Due to this, the problems arise that a large number of doubly overlapped images are displayed, so that it becomes difficult to recognize the tridimensional objects. Accordingly, in this embodiment of the present invention, it is anticipated to enhance the ease of performing recognition of an object to be monitored by, along with preventing disappearance of images in the neighborhood of the boundaries, also narrowing down as much as possible the regions for display of doubly overlapped images, FIGS. 8 through 15 are figures for explanation of the method for setting the overlapped image display regions of this embodiment (hereinafter these will be termed "combination display regions). First, as shown in FIG. 8, region setting lines L1 and L2 for setting the combination display regions are set in the display area E10 where the overhead view image 300 is displayed. The overlapped region c0 is divided into two by the region setting line L1, and the overlapped region c1 is divided into two by the region setting line L2.

In the example shown in FIG. 8, the region setting line L1 is the perpendicular bisector of the line segment L20 that connects the camera 30a and the camera 30c, while the region setting line L2 is the perpendicular bisector of the line segment L30 that connects the camera 30b and the camera 30c. Since the region setting line L1 is the same distance from the cameras 30a and 30c, accordingly, in a region in the part of the overlapped region c0 that is more toward the camera 30a than the region setting line L1, the image generated by the camera 30a is larger than the image generated by the camera 30c; while, in a region in the part of the overlapped region c0 that is more toward the camera 30c than the region setting line L1, the image generated by the camera 30c is larger than the image generated by the camera 30a. Due to this, in order to obtain a larger captured image, on the side toward the camera 30a from the region setting line L1, it is desirable to use the image captured by the camera 30a; while, on the side toward the camera 30c from the region setting line L1, it is desirable to use the image captured by the camera 30c. The same facts hold in relation to the region setting line L2.

Of course, the region setting lines L1 and L2 are not to be considered as being limited to being the perpendicular bisectors described above; for example, the region setting line L1 would be acceptable for this line to be any straight line that intersects the line segment L20 connecting the camera 30a and the camera 30c, and, the region setting line L2 would be acceptable for this line to be any straight line that intersects the line segment L30 connecting the camera 30b and the camera 30c. It should be understood that, while the line segment that connects the camera 30a and the camera 30c is defined above as being precisely the line segment that connects the points of intersection of the optical axes and the imaging elements of the cameras 30a and 30c, it could in fact be any line segment that connects the camera 30a and the camera 30c.

Now, before explaining the combination display regions of this embodiment, a case will be explained in which no combination display regions as described hereinafter are provided where the region setting line L1 divides between the region monitored by the camera 30a and the region monitored by the camera 30c, and where the region setting line L2 divides between the region monitored by the camera 30b and the region monitored by the camera 30c.

In this case, in the neighborhood of the region setting lines L1 and L2, the collapsed image almost disappears, and only an image of the base of the tridimensional object comes to be displayed. Moreover, although the region z0 is a region more toward the camera 30a than the region setting line L1, this region z0 is only captured by the camera 30c, and is a blind spot region in which capturing by the camera 30a is not possible. In a similar manner, although the region z1 is a region more toward the camera 30b than the region setting line L2, this region z1 is only captured by the camera 30c, and is a blind spot region in which capturing by the camera 30b is not possible. Here, these regions z0 and z1 will be termed the "blind spots" z0 and z1.

In the display region E11 (excluding the blind spot z0) that is above the region setting line L1, the display image e1 that is based upon the image captured by the camera 30a is displayed. Moreover, in the display region E21 (excluding the blind spot z1) that is above the region setting line L2, the display image e2 that is based upon the image captured by the camera 30b is displayed. And, in the display region E31 between the region setting line L1 and the region setting line L2, the display image e3 that is based upon the image captured by the camera 30c is displayed.

For example, if a tridimensional object (a person) is present at the position B1 away from the region setting line L1 as shown in FIG. 8, then the collapsed image of this tridimensional object in the upper view-point image becomes the image to which the reference symbol Pa2 is appended. This collapsed image Pa2 is displayed as though lying down along the straight line L11 that connects the camera 30a and the tridimensional object. And its collapsed length N is calculated by the calculation equation "N=n·h/(H-h)" described above. In this case, the entire collapsed image Pa2 is displayed.

On the other hand, if a tridimensional object is present at the position B2 that is near the region setting line L1, then only a portion (the base) of the collapsed image Pc1 comes to be displayed in the display region E31. As described above, the display image e1 and the display image e3 both exist in the overlapped region c0, and both a collapsed image Pa1 and a collapsed image Pc1 for the tridimensional object are present at the position B2. However, if the region setting line L1 is set and the display region is subdivided so that the display image e1 is displayed in the display region E11 while the display image e3 is displayed in the display region E31, then, if the collapsed image Pc1 straddles the display region E11 and the display region E31, only an image of its base is displayed on the side of the display region E11, while its portion shown by broken lines on the side of the display region E31 is not displayed. Moreover, since the collapsed image Pa1 is an image in the display image e1, accordingly it is not displayed in the display region E31. Due to this, there is a danger that the fact will be overlooked that a tridimensional object (for example, a person) is near the vehicle body 20, which is displayed as the image G1.

Figure 9:
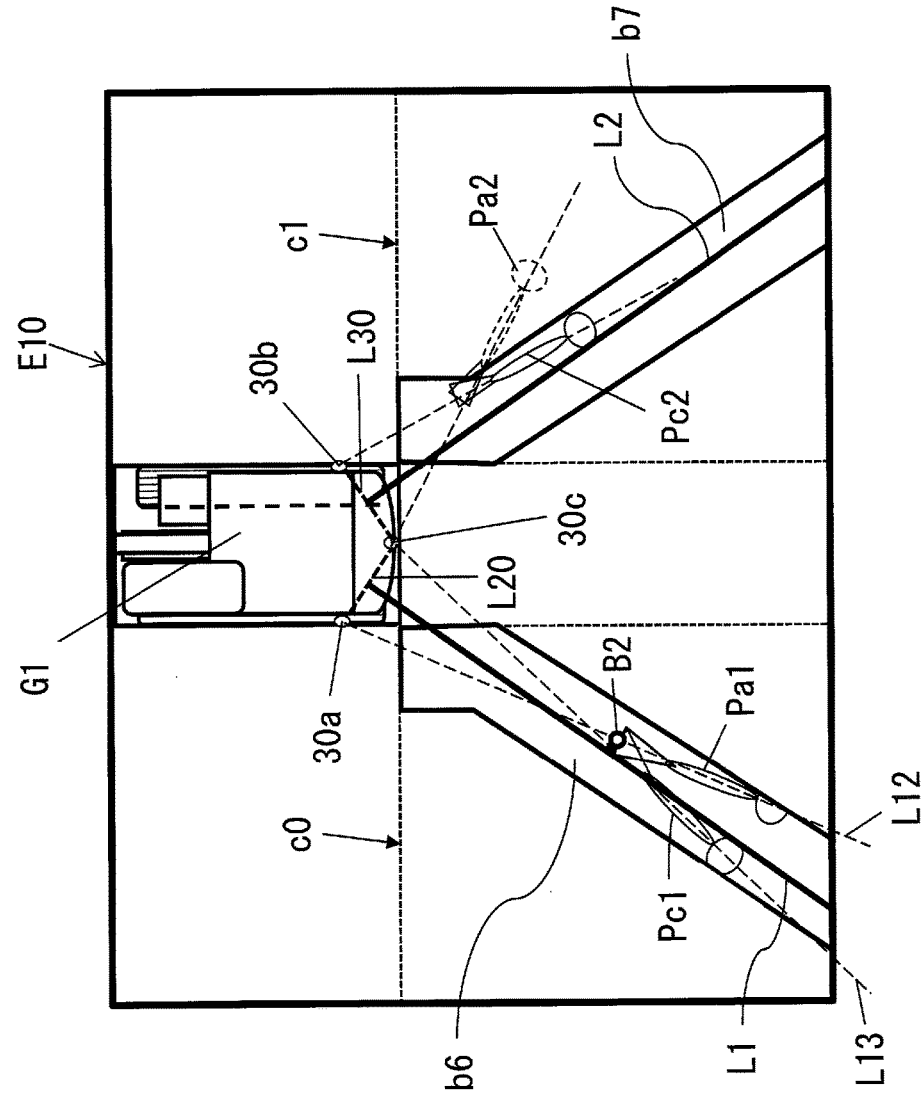
FIG. 9 is a figure showing combination display regions b6 and b7 in overlapped regions c0 and c1.

In this embodiment, in order to solve this type of problem, it is arranged to set combination display regions b6 and b7 as shown in FIG. 9 in portions of the overlapped regions c0 and c1. In the combination display region b6, both the display image e1 and the display image e3 are displayed in a predetermined display format. In FIG. 9, both collapsed images Pa1 and Pc1 are displayed in the combination display region b6. The collapsed image Pa1 is lying down along the straight line L12 that connects the camera 30a and the position B2, while the collapsed image Pc1 is lying down along the straight line L13 that connects the camera 30c and the position B2. In a similar manner, both the display image e2 and the display image e3 are displayed in a predetermined display format in the combination display region b7.

Figure 10:
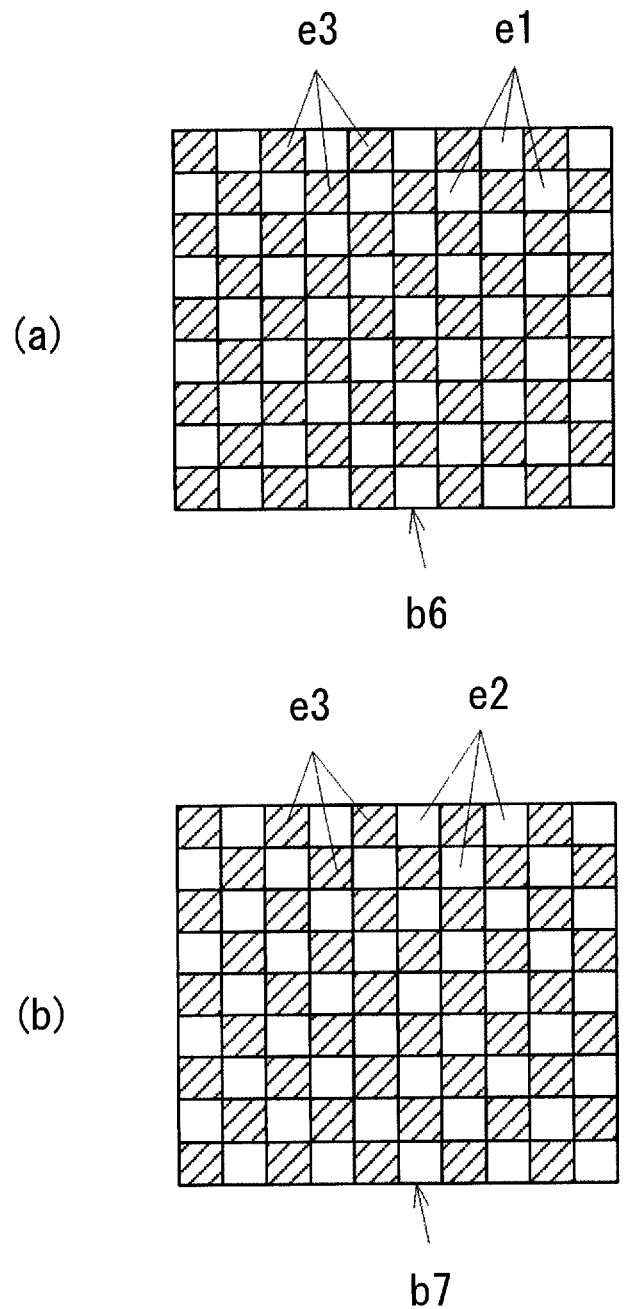
FIG. 10 is a figure for explanation of a display form (a drawing technique) for the combination display regions b6 and b7.

It should be understood that, in the combination display regions b6 and b7, a combination display is provided as shown in FIG. 10. FIG. 10 is a figure showing an example of a display format (a drawing technique) for the combination display regions, in which the two display images are arranged in a checkerboard pattern. FIG. 10(a) is a figure showing a composite display image for the combination display region b6, in which the display image e1 and the display image e3 are arranged in a checkerboard pattern. And FIG. 10(b) shows a composite display image for the combination display region b7, in which the display image e2 and the display image e3 are arranged in a checkerboard pattern. The size of the grids upon which these checkerboard patterns are based may be set as desired in pixel units.

The drawing technique shown in FIG. 10 is only an example. Various methods are per se known as drawing techniques for the combination display regions, and any of these drawing techniques may be applied. For example, an arrangement into stripes may be employed, or alpha blending processing may be performed in which a transmissivity (an alpha value) is set for each overlapping pixel. In other words, in the combination display regions, combination images are displayed that are generated by combining the image signals outputted from two cameras.

Figure 11:
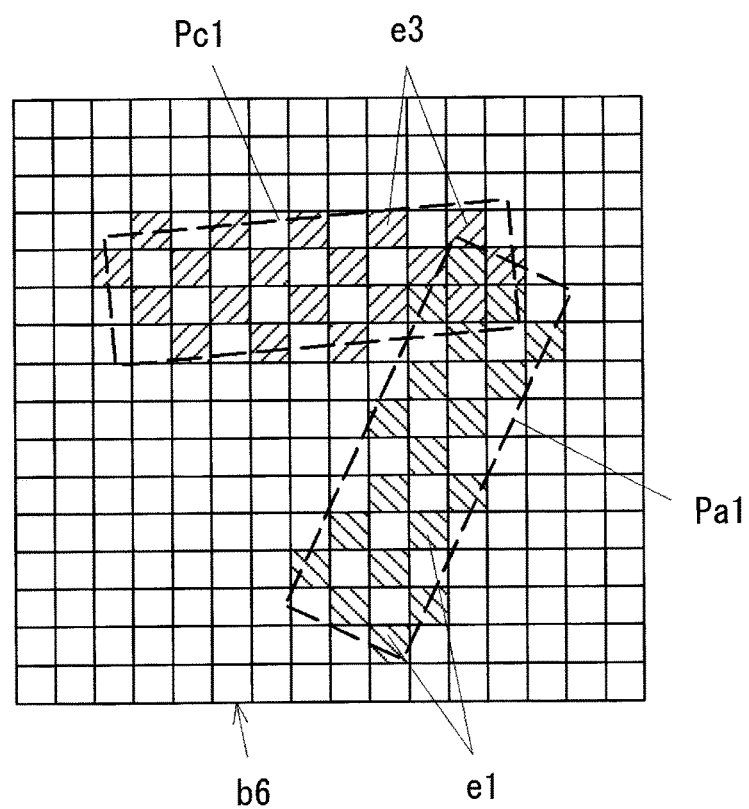
FIG. 11 is a figure showing collapsed images Pa1 and Pc1 in the combination display region b6.

FIG. 11 is a figure showing the collapsed images Pa1 and Pc1 in the combination display region b6 of FIG. 10(a). It should be understood that the broken lines indicate the regions where the collapsed images Pa1 and Pc1 are displayed, and are not shown on the actual display image. In FIG. 11, in order to make the collapsed images Pa1 and Pc1 easy to understand, only the display image e1 in which the collapsed image Pa1 is displayed and the display image e3 in which the collapsed image Pc1 is displayed are shown, and display of the background image is omitted.

Next, a method for setting the combination display regions b6 and b7 will be explained with reference to FIGS. 12 and 13. First, the intersection points of the region setting line L1 that divides the overlapped region c0 into two and the boundary of the overlapped region c0 are specified as B4 and B5. Here, the point of intersection that is closer to the image G1 representing the vehicle body 20 is termed B4, while the point of intersection that is more remote from the image G1 is termed B5.

Next, the collapsed lengths N of the collapsed image Pa1 (the image based upon the image captured by the camera 30a) and of the collapsed image Pa1 (the image based upon the image captured by the camera 30c) when the virtual monitoring target is disposed at the position of the point of intersection B4 are calculated. In a similar manner, the collapsed lengths N of the collapsed image Pa2 (the image based upon the image captured by the camera 30a) and of the collapsed image Pc2 (the image based upon the image captured by the camera 30c) when the virtual monitoring target is disposed at the position of the point of intersection B5 are calculated. Here, the virtual monitoring target is a tridimensional object of a predetermined height that is set in advance; for example, a tridimensional object having the height of 1.5 m described above may be taken as the virtual monitoring target. This height (here 1.5 m) will be termed the "standard monitoring height".

Figure 12:
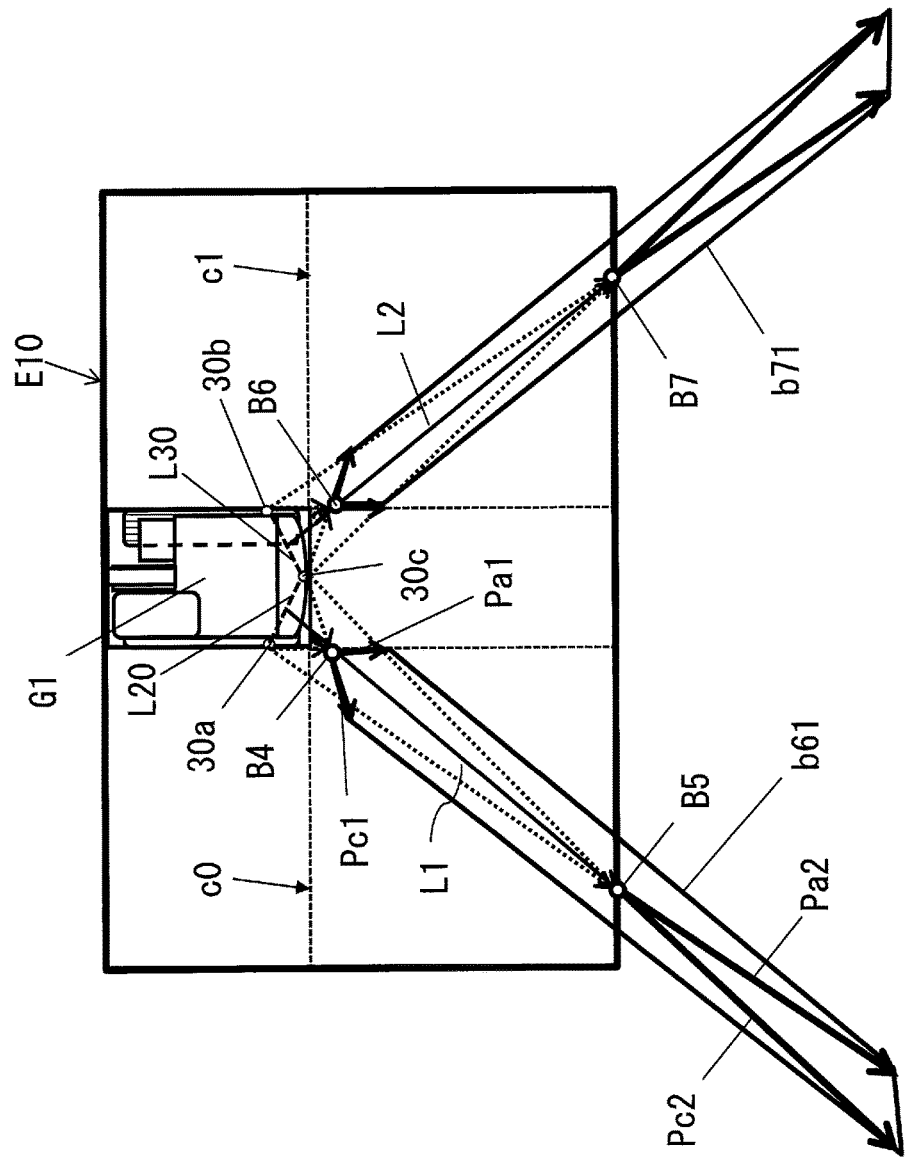
FIG. 12 is a figure for explanation of a method for setting the combination display region b6.

In FIG. 12, the collapsed images Pa1, Pa2, Pc1, and Pc2 are shown by arrow signs, and the ends of these arrow signs indicate the breast of the virtual monitoring target (its top at the standard monitoring height). And, when the point of intersection B4, the end of the arrow sign Pc1, the end of the arrow sign Pc2, the end of the arrow sign Pa2, the end of the arrow sign Pa1, and the point of intersection B4 are connected in that order by line segments, the region surrounded by those line segments is taken as being a combination display region b61 (a part of the combination display region b6). This combination display region b61 is corresponds to the region, when the virtual monitoring targets are disposed upon the region setting line from the point of intersection B4 to the point of intersection B5, collapsed images of these virtual monitoring targets are displayed. In a similar manner, the intersection points of the region setting line L2 and the boundary of the overlapped region c1 are specified as B6 and B7, and a combination display region b71 (a part of the combination display region b7) is set by a similar procedure to that explained above.

As described above, the region of the blind spot z0 is a region in which capturing by the camera 30a is not possible, and the region of the blind spot z1 is a region in which capturing by the camera 30b is not possible. Due to this, combination display regions are also set for each of these blind spots z0 and z1. The combination display region b6 shown in FIG. 9 is a region resulting from the addition of a combination display region related to the blind spot z0 to the combination display region b61 described above. And, in a similar manner, the combination display region b7 shown in FIG. 9 is a region resulting from the addition of a combination display region related to the blind spot z1 to the combination display region b71 described above.

Figure 13:
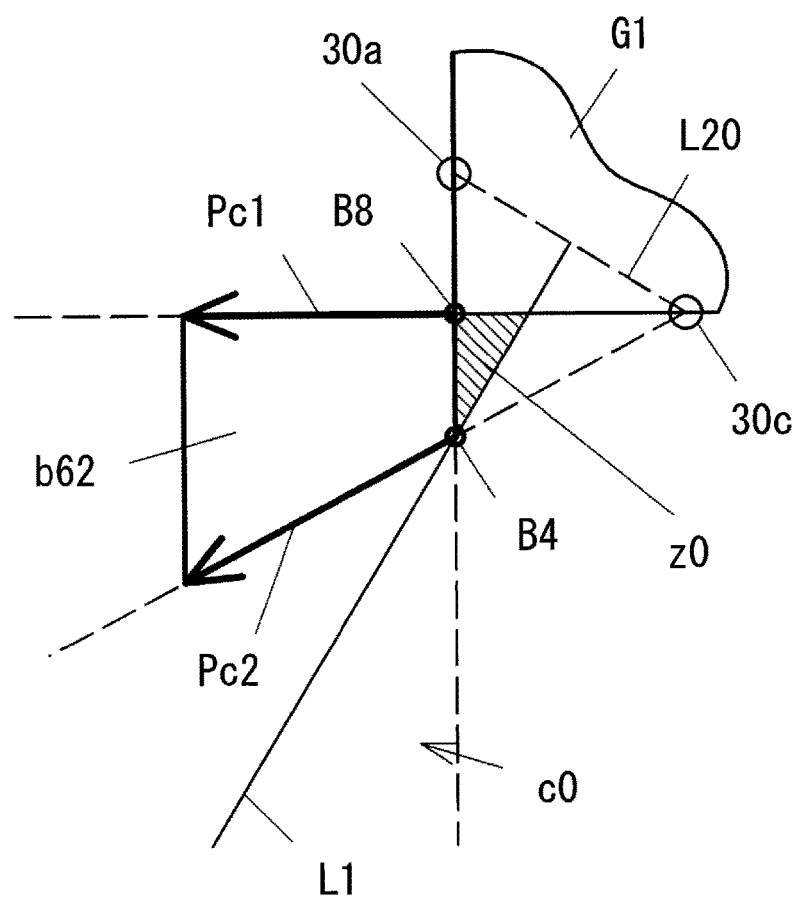
FIG. 13 is a figure for explanation of a method of setting a combination display region for a blind spot z0.

FIG. 13 is a figure showing a method for setting such a combination display region for the blind spot z0. Since the blind spot z0 is a region in which only capturing by the camera 30c is possible, accordingly cases will be considered in which the virtual is monitoring target is disposed upon the boundary between the blind spot z0 and the overlapped region c0, and collapsed images of the virtual monitoring target based upon the image captured by the camera 30c will be considered. In the example shown in FIG. 13, on the boundary between the blind spot z0 and the overlapped region c0, virtual monitoring targets are disposed at the position B8 closest to the vehicle body 20 (which is shown by the image G1) and at the point B4 most remote from the vehicle body 20. The arrow sign Pc1 is the collapsed image of the virtual monitoring target that is disposed at the position B8, while the arrow sign Pc2 is the collapsed image of the virtual monitoring target that is disposed at the position B4. And the region that is defined by connecting the position B8, the end of the arrow sign Pc1, the end of the arrow sign Pc2, the position B4, and the position B8 in that order is taken as being the combination display region b62 for this blind spot z0. The breasts of all the virtual monitoring targets who are positioned in the blind spot z0 are included in this combination display region b62. Although this is not shown in the figure, it should be understood that a combination display region for the blind spot z1 can be set by a similar procedure to that employed for setting this combination display region b62.

Figure 14:
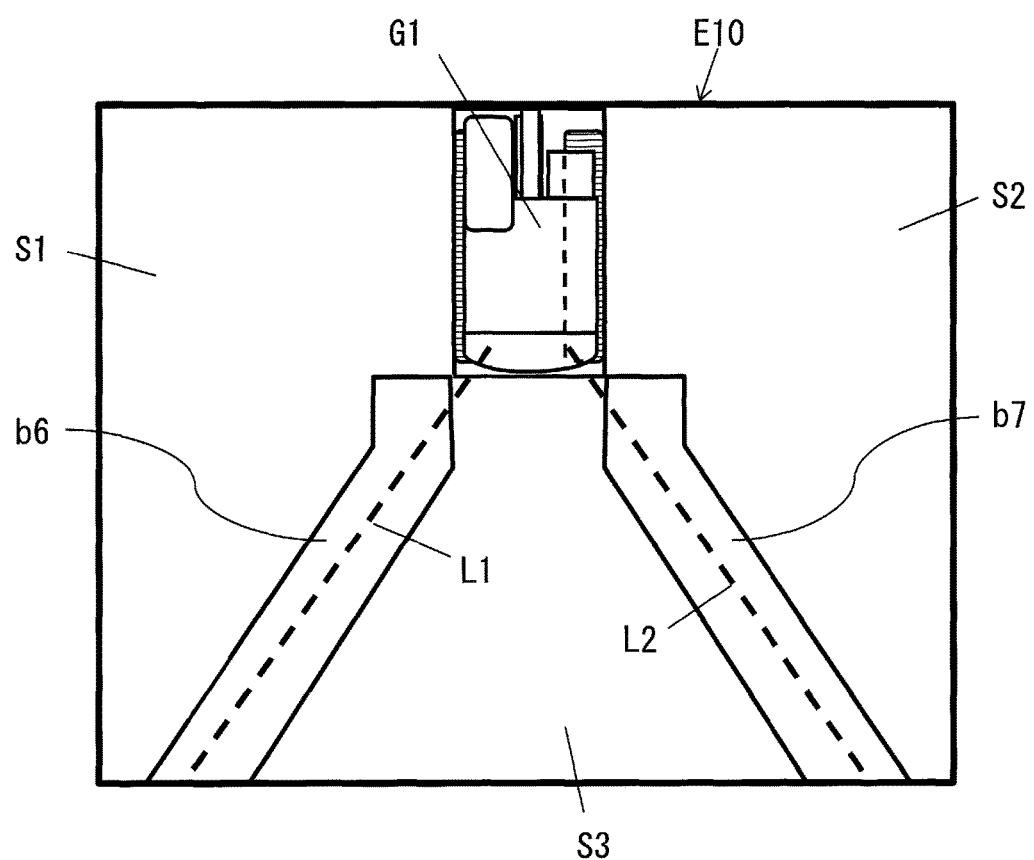
FIG. 14 is a figure for explanation of a region that is displayed upon a periphery observation monitor 220.

FIG. 14 is a figure for explanation of the region that is displayed upon the periphery observation monitor 220. In the surroundings of an image G1 that represents the vehicle body 20, there are provided: a display area S1 in which an upper view-point image based upon the image captured by the camera 30a is displayed; a display area S2 in which an upper view-point image based upon the image captured by the camera 30b is displayed; a display area S3 in which an upper view-point image based upon the image captured by the camera 30c is displayed; and the combination display regions b6 and b7. It should be understood that the region setting lines L1 and L2 that are shown by the broken lines are not displayed.

It should be understood that, if straight lines that pass through corners of the image G1 are set as the region setting lines L1 and L2, then the blind spots z0 and z1 described above may not be generated. Moreover for a work machine, in some cases, a special monitoring range is set within a predetermined range of the surroundings of the vehicle body 20, and monitoring is performed so that a person or the like should not carelessly enter this monitoring range. In this type of case, the combination display region is set while taking this monitoring range into consideration, so as to prevent only a portion of the monitoring target from being displayed within the monitoring range. It should be understood that the combination display regions b6 and b7 shown in FIG. 9 are employed if the monitoring range is to be taken as being the entire the display area E10.

Figure 15:
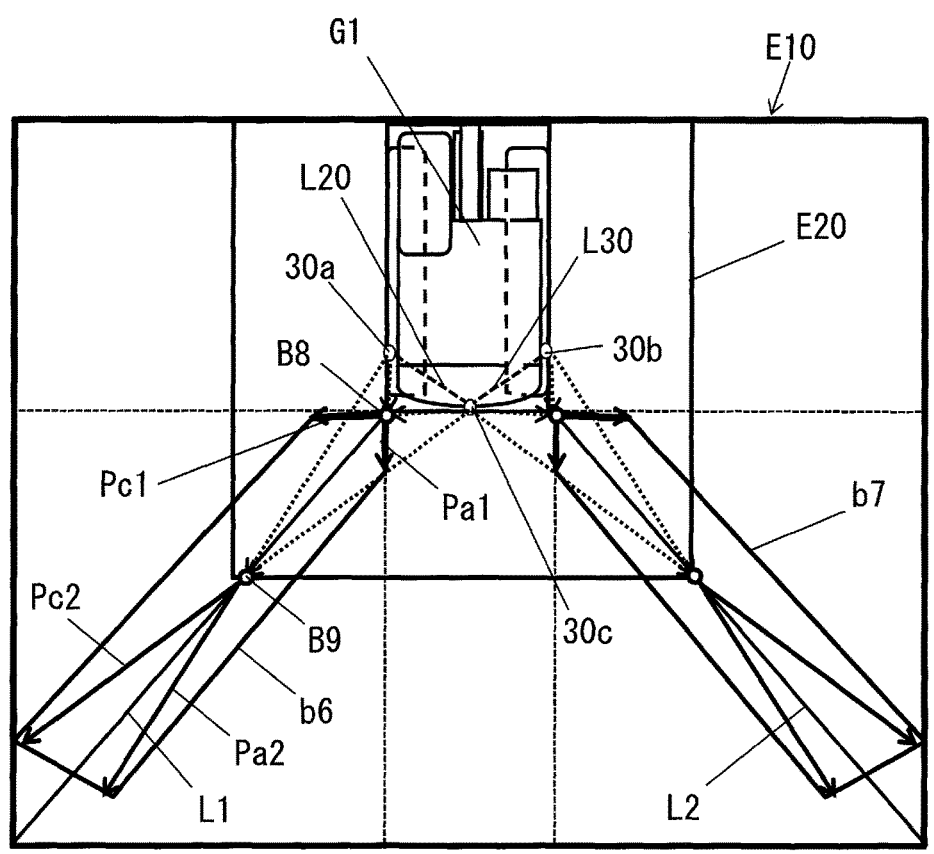
FIG. 15 is a figure showing combination display regions b6 and b7 when a monitoring range E20 has been set.

FIG. 15 is a figure showing the combination display regions b6 and b7 when region setting lines L1 and L2 that pass through the left corner and the right corner of the image G1 have been set, and when moreover the monitoring range described above has been set to the surroundings of the image G1. E20 is the boundary of this monitoring range, which may be, for example, a monitoring range of within 3.0 m from the vehicle body 20 (from the image G1). When the combination display region b6 is set, virtual monitoring targets are disposed at the point of intersection B8 of the region setting line L1 and the overlapped region c0 (the upper right corner of the overlapped region c0) and at the point of intersection B9 of the region setting line L1 and the monitoring range E20.

For a virtual monitoring target disposed at the point of intersection B8, a collapsed image Pa1 (a position of collapse) based upon the image captured by the camera 30a and a collapsed image Pc1 (a position of collapse) based upon the image captured by the camera 30c are calculated. In a similar manner, for a virtual monitoring target disposed at the point of intersection B9, a collapsed image Pa2 (a position of collapse) based upon the image captured by the camera 30a and a collapsed image Pc2 (a position of collapse) based upon the image captured by the camera 30c are calculated. These collapsed images are shown by the arrow signs. The region that is defined by joining the point of intersection B8, the end of the arrow sign Pc1, the end of the arrow sign Pc2, the end of the arrow sign Pa2, the end of the arrow sign Pa1, and the point of intersection B8 in that order is the combination display region b6. While the details thereof will be omitted, the combination display region b7 related to the region setting line L2 can also be set by a similar procedure to that employed in the case of the combination display region b6.

Variant Embodiment

Figure 16:
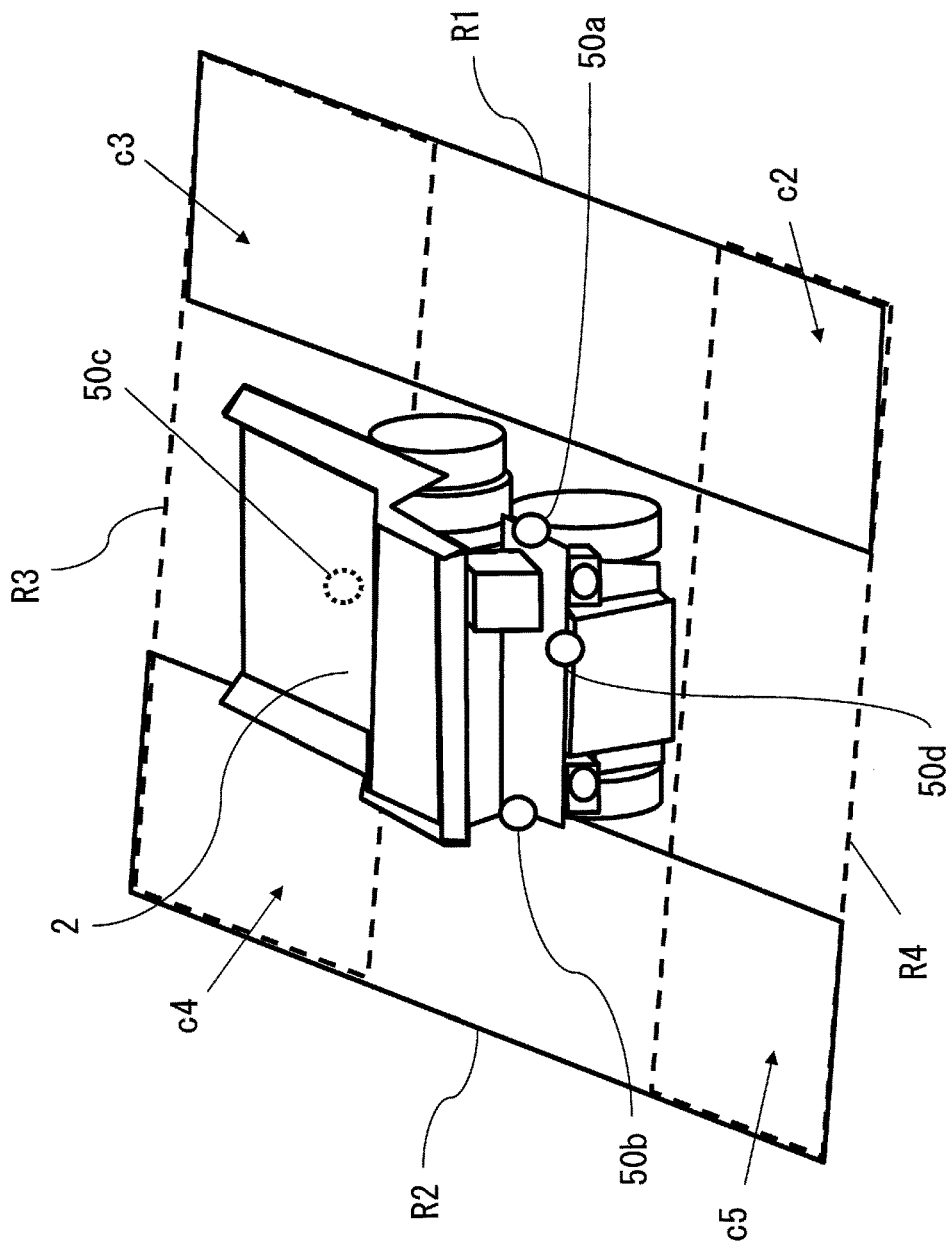
FIG. 16 is a figure showing a perspective view schematically showing a dump truck 2, and a range that is displayed upon the periphery monitoring device.
Figure 17:
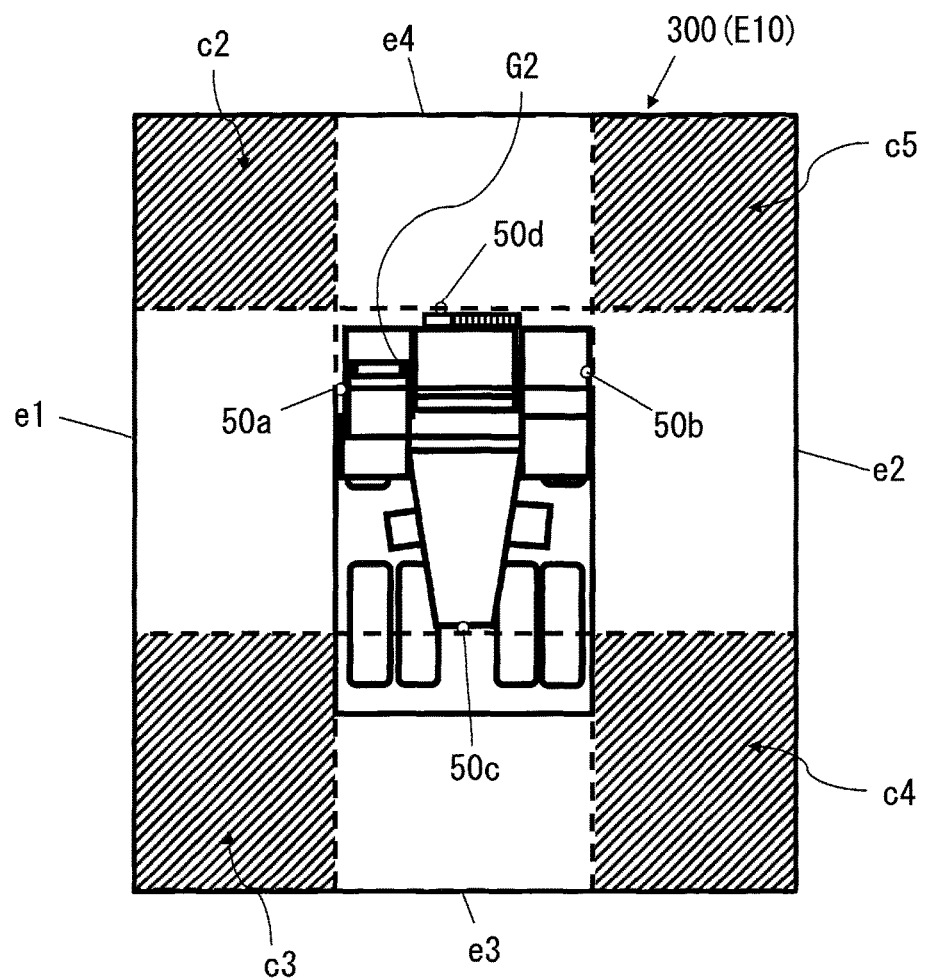
FIG. 17 is a figure showing an overhead view image 300 that is displayed upon the periphery observation monitor 220.

FIGS. 16 through 21 are figures for explanation of a case in which the present invention is applied to a periphery monitoring device of a dump truck 2. FIGS. 16 and 17 are figures for explanation of the camera mounting positions and their display ranges (the ranges that are monitored by the cameras). FIG. 16 is a figure showing a perspective view schematically showing the dump truck 2 and the range that is displayed by the periphery monitor device. And FIG. 17 is a figure showing an overhead view image 300 that is displayed upon the periphery observation monitor 220.

As shown in FIG. 16, four cameras 50a through 50d are mounted to the dump truck 2. In concrete terms, a camera 50d that captures the surroundings in front of the vehicle, a camera 50a that captures the surroundings to the left side of the vehicle, a camera 50b that captures the surroundings to the right side of the vehicle, and a camera 50c that captures the surroundings behind the vehicle are provided. A partial region R1 within the image captured by the camera 50a is displayed upon the periphery observation monitor 220 as a display image e1. In a similar manner, a partial region R2 within the image captured by the camera 50b is displayed as a display image e2, a partial region R3 within the image captured by the camera 50c is displayed as a display image e3, and a partial region R4 within the image captured by the camera 50d is displayed as a display image e4.

FIG. 17 is a figure showing the overhead view image 300 that is displayed upon the periphery observation monitor 220. An image G2 that indicates the dump truck 2 is displayed upon the periphery observation monitor, and the display images e1 through e4 are arranged around this image G2. c2 is the region of overlap between the display image e1 and the display image e4, c3 is the region of overlap between the display image e1 and the display image e3, c4 is the region of overlap between the display image e2 and the display image e3, and c5 is the region of overlap between the display image e2 and the display image e4.

Figure 18:
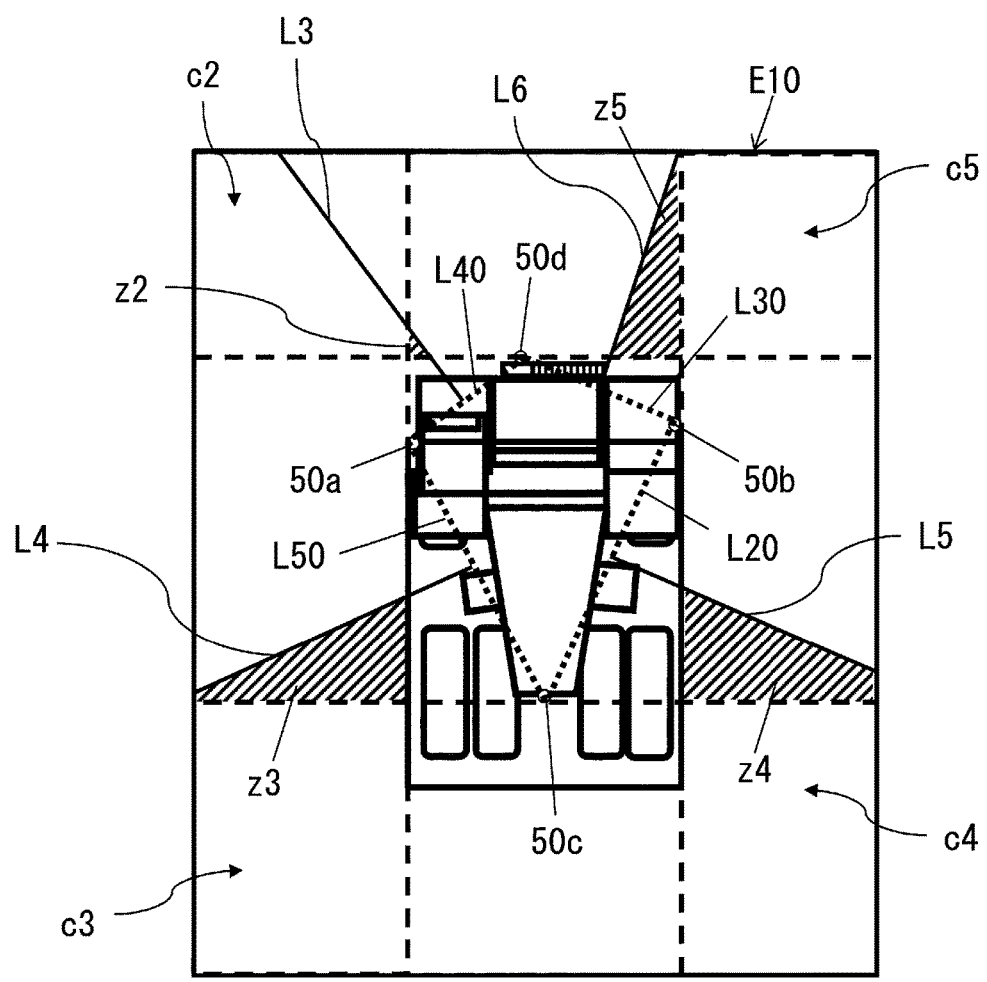
FIG. 18 is a figure showing an example of region setting lines in a variant embodiment.

FIG. 18 is a figure showing an example of region setting lines in this variant embodiment. In this variant embodiment of FIG. 18 as well, in a similar manner to the case in FIG. 8 described above, the perpendicular bisectors of line segments joining between the cameras are set as the region setting lines. In concrete terms, a region setting line L3 is set as the perpendicular bisector of a line segment L40 that connects between the cameras 50a and 50d, a region setting line L4 is set as the perpendicular bisector of a line segment L50 that connects between the cameras 50a and 50c, a region setting line L5 is set as the perpendicular bisector of a line segment L20 that connects between the cameras 50b and 50c, and a region setting line L6 is set as the perpendicular bisector of a line segment L30 that connects between the cameras 50b and 50d.

The region setting line L3 divides the overlapped region c2 into two portions. Moreover, a blind spot z2 where capturing cannot be performed by the camera 50a occurs on the side of the region setting line L3 toward the camera 50a. On the other hand, the region setting lines L4 through L6 do not pass through any overlapped regions. The region setting line L4 passes through a region that can only be captured by the camera 50a, and a blind spot z3 where capturing cannot be performed by the camera 50c occurs on the side of the region setting line L4 toward the camera 50c. And the region setting line L5 passes through a region that can only be captured by the camera 50b, and a blind spot z4 where capturing cannot be performed by the camera 50c occurs on the side of the region setting line L5 toward the camera 50c. Moreover, the region setting line L6 passes through a region that can only be captured by the camera 50d, and a blind spot z5 where capturing cannot be performed by the camera 50b occurs on the side of the region setting line L6 toward the camera 50b.

In relation to the region setting line L3 that divides the overlapped region c2 into two portions, the combination display region setting method for the overlapped regions is performed in a similar manner to the method explained with FIG. 12, and it will be acceptable to deal with the blind spot z2 in a similar manner to the case of FIG. 13. Moreover, in relation to the region setting lines L4 through L6 for which the blind spots z3 through z5 are generated, it will be acceptable to set combination display regions in a similar manner to the method explained with FIG. 13. For example, when a combination display region is set for the blind spot z3 in relation to the region setting line L4, the situation becomes as shown in FIG. 19.

Figure 19:
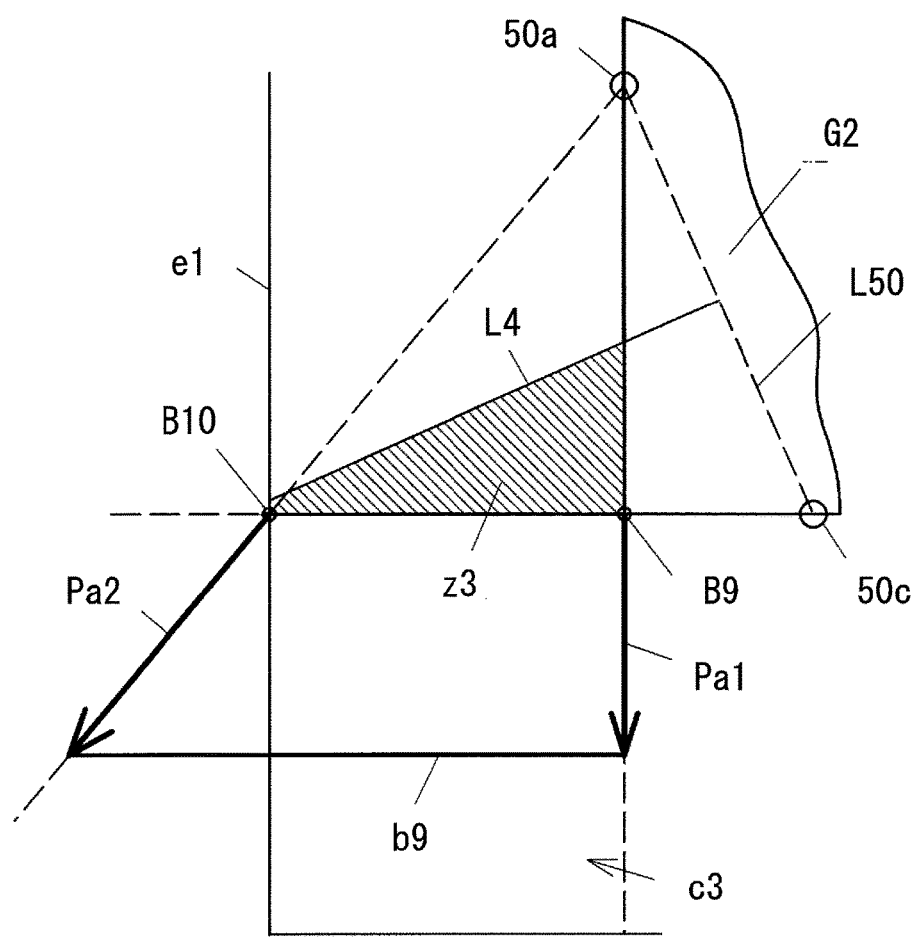
FIG. 19 is a figure showing a combination display region b9 that is set to correspond to a blind spot z3.

FIG. 19 is a figure showing the combination display region b9 that is set to correspond to the blind spot z3. Since the blind spot z3 is a region that can only be captured by the camera 50a, accordingly a case will be considered in which a virtual monitoring target is disposed upon the boundary between the blind spot z3 and the overlapped region c3. On the boundary between the blind spot z3 and the overlapped region c3, the virtual monitoring targets are disposed at the position B9 that is closest to the image G2 and at the position B10 that is furthest from the image G2. The arrow sign Pa1 indicates the collapsed image of the virtual monitoring target that is disposed at the position B9, and the arrow sign Pa2 indicates the collapsed image of the virtual monitoring target that is disposed at the position B10. And the region that is defined by connecting the position B9, the end of the arrow sign Pa1, the end of the arrow sign Pa2, the position B10, and the position B9 again in that order is taken as being the combination display region b9 for the blind spot z3.

Figure 20:
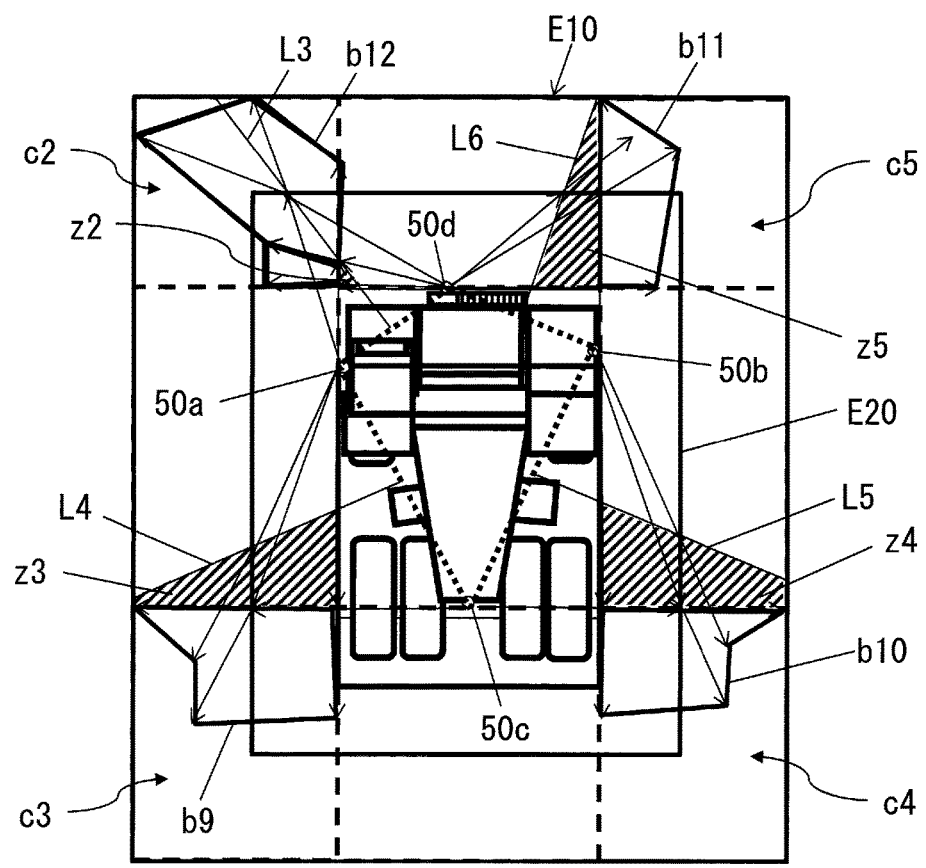
FIG. 20 is a figure showing combination display regions b9, b10, b11, and b12 in a variant embodiment.
Figure 21:
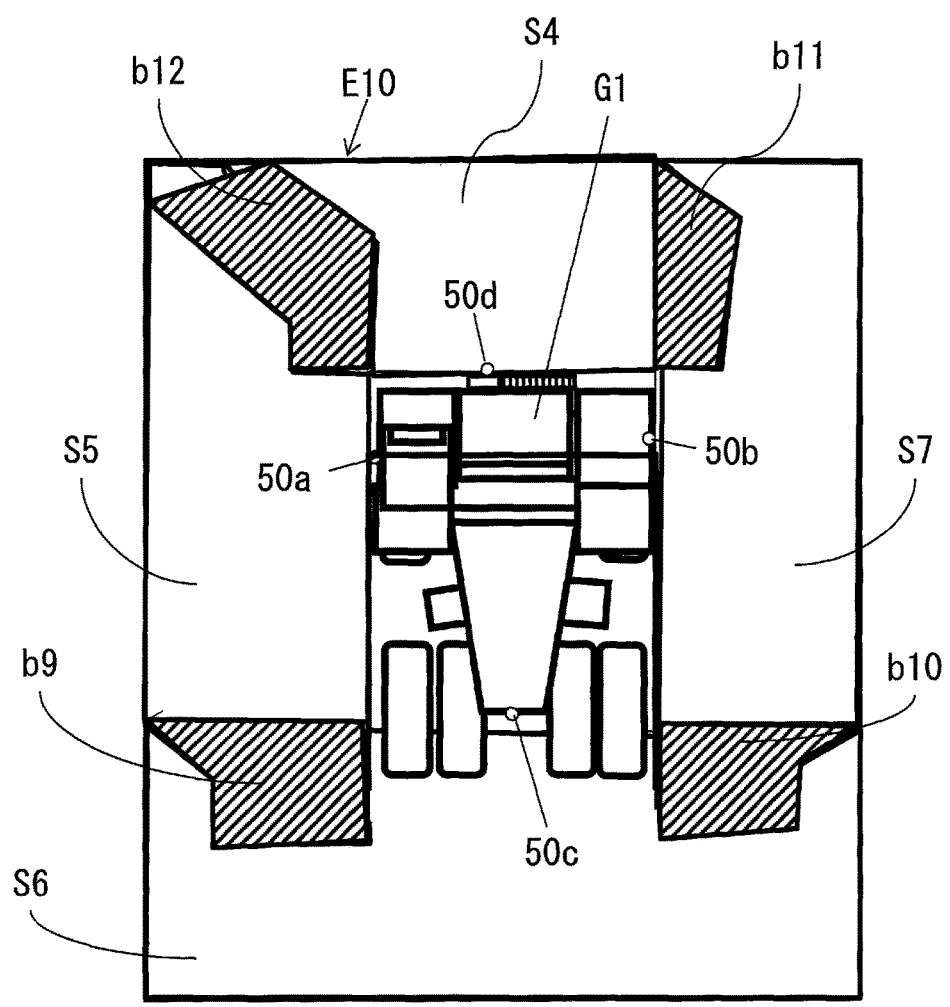
FIG. 21 is a figure showing display regions upon the periphery observation monitor 220.

Moreover, if a similar monitoring range E20 to that in the case of FIG. 15 is provided, then combination display regions b9, b10, b11, and b12 are set as shown in FIG. 20. FIG. 21 is a figure showing display regions upon the periphery observation monitor 220. The display area S5 in which the upper view-point image based upon the image captured by the camera 50a is displayed, the display area S6 in which the upper view-point image based upon the image captured by the camera 50c is displayed, the display area S7 in which the upper view-point image based upon the image captured by the camera 50b is displayed, and the combination display regions b9, b10, b11 and b12 are provided in the surroundings of the image G2 that represents the dump truck 2.

As has been explained above, as shown in FIGS. 2, 5, and 6, the periphery monitoring device for a work machine 10 according to the present invention comprises: the plurality of cameras 30a, 30b, 30c that capture images of the surroundings of the work machine (the hydraulic excavator 100); the combination image generating unit 210 that converts the images captured by the plurality of cameras 30a, 30b, 30c into the display images e1 through e3 that are upper view-point images, and that generates an overhead view image 300 of the surroundings of the work machine on the basis thereof; and the periphery observation monitor 220 that displays the overhead view image 300 in the display area E10. And the combination image generating unit 210: when generating the overhead view image of the overlapped region c0 in which the display image e1 relating to the image captured by the first camera 30a and the display image e3 relating to the image captured by the camera 30c overlap one another: based upon the height h of the virtual monitoring target (refer to FIG. 7), as shown in FIG. 14, sets the display area S1 in which the display image e1 is displayed and the display area S3 in which the display image e3 is displayed, and also sets the combination display region b6 in which the composite display image based upon the display images e1 and e3 is displayed.

By setting the combination display region b6 in this manner, it is possible to prevent the disappearance of the collapsed image of the monitoring target (the phenomenon in which the greater portion of that image is not displayed, except for its base). Moreover, since the collapsed length N is calculated based upon the height h of the virtual monitoring target and then the combination display region b6 is set, accordingly, as shown in FIG. 9, it is possible to keep narrow the range of the combination display region b6 in which the two collapsed images Pa1 and Pc1 of the monitoring target are displayed, so that it is possible to provided a display with which the user can easily monitor the periphery situation.

It should be understood that, as shown in FIG. 12, the combination display region b61 is set based upon the region setting line L1 that intersects the line segment L20 that connects the position of installation of the camera 30a and the position of installation of the camera 30c in the display area E10, and based upon the height h of the virtual monitoring target.

Moreover, if the monitoring range E20 is set on the side within the display area E10, then the combination display region b6 is set based upon the monitoring range E20, of the region setting line L1, and of the height h of the virtual monitoring target. Due to this, monitoring within the monitoring range E20 becomes easy to perform.

If, as shown in FIG. 12, the region setting line L1 passes through the overlapped region c0, then the combination display region b61 is set based upon the collapsed images in the display images e1 and e3 when the virtual monitoring targets are disposed upon the region setting line L1. The boundary of the combination display region b6 is set according to the collapsed images when the monitoring targets are disposed at the positions B4 and B5 upon the region setting line L1, and, when the virtual monitoring target moves along the region setting line L1, the collapsed images move within the combination display region b6.

On the other hand, as shown in FIG. 19, when the region setting line L4 passes through a region in the display image e1 that excludes the overlapped region c3, and a blind spot z3 in which capturing by the camera 50c is not possible occurs between the region setting line L4 and the overlapped region c3, then the combination display region b9 is set based upon the collapsed images Pa1 and Pa2 in the display image e1 when the virtual monitoring target is disposed within the blind spot region z3. In this case, the boundary of the combination display region b9 is set according to the collapsed images when the virtual monitoring target is disposed upon the boundary between the blind spot z3 and the overlapped region c3.

It should be understood that while, in the embodiments described above, the combination display regions were set in relation to all of the region setting lines passing through line segments connecting the cameras, there is no need necessarily to set combination display regions for all of the region setting lines. For example since, in the case of the hydraulic excavator 100 shown in FIG. 1, an operator who is riding within the cabin 22a of the driving compartment 22 can comparatively easily check to the left rear of the vehicle by visual observation in a mirror, accordingly it would also be acceptable to arrange to set only the combination display region b7 for the overlapped region c1 on the right rear of the vehicle, as shown in FIG. 9. Moreover while, with the embodiment employed for the hydraulic excavator 100, an example was shown of a combination display of images from three cameras, one to the left, one to the right, and one behind the excavator 100, this is not particularly limitative; it would also be acceptable, in the same way as in the case of the example of the dump truck 2, further to provide another camera in front, and thereby to provide a combination display of four images from four cameras, The embodiments described above may be employed singly or in combination. This is because the beneficial effects of each embodiment can be obtained either singly or in mutual synergy. Moreover, the present invention is not to be considered as being limited to the embodiments described above, provided that the essential characteristics of the present invention are preserved.

The content of the disclosure of the following application, upon which priority is claimed, is hereby incorporated herein by reference:
Japanese Patent Publication No. 2014-45075 (filed on 7 Mar. 2014).

REFERENCE SIGNS LIST

2: dump truck
10: periphery monitoring device
30, 30a-30c, 50a-50d, 101: cameras
100: hydraulic excavator
200: controller
210: combination image generating unit
220: periphery observation monitor
300: overhead view image
b6, b7, b9-b12, b61, b62, b71: combination display regions
c0, c1-c5: overlapped regions
e1-e4: display images
E20: monitoring range
L1-L6: region setting lines
L20, L30, L40, L50: line segments
Pa1, Pa2, Pc1, Pc2: collapsed image
S1-S7: display areas
z0, z1-z5: blind spots.

The invention claimed is:

1. A periphery monitoring device for a work machine, comprising:
a plurality of cameras that each captures an image of surroundings of the work machine;
an image generator that is connected to the plurality of cameras, converts the image captured by each of the plurality of cameras into an upper view-point image, and generates an overhead view image of the surroundings of the work machine based upon upper view-point images; and
a display monitor that is connected to the image generator and displays the overhead view image output from the image generator in an overhead view image display region,
wherein when generating an overhead view image of an overlap region of a first upper view-point image relating to the image captured by a first camera included in the plurality of cameras and a second upper view-point image relating to the image captured by a second camera included in the plurality of cameras,
the image generator, based upon a height of a virtual monitoring target, sets a first region in which only the first upper view-point image is displayed in the overlap region and a second region in which only the second upper view-point image is displayed in the overlap region, and also sets a third region in which a composite display image based upon the first and second upper view-point images is displayed in the overlap region.

2. The periphery monitoring device for a work machine according to claim 1, wherein
the image generator sets the third region based upon a region setting line that intersects a line segment connecting a position of installation of the first camera and a position of installation of the second camera, and based upon the height of the virtual monitoring target.

3. The periphery monitoring device for a work machine according to claim 2, wherein:
a monitoring range is set on a side within the overhead view image display region; and
the image generator sets the third region in the overlap region based upon the monitoring range, the region setting line, and the height of the virtual monitoring target.

4. The periphery monitoring device for a work machine according to claim 2, wherein,
when the region setting line passes through the overlap region,
then the image generator sets the third region based upon collapsed images in the first and second upper view-point images when the virtual monitoring target is disposed upon the region setting line.

5. The periphery monitoring device for a work machine according to claim 2, wherein,
when the region setting line passes through a region in the first upper view-point image that excludes the overlap region, and a blind spot region in which capturing by the second camera is impossible occurs between the region setting line and the overlap region,
then the image generator sets the third region based upon the collapsed images in the first upper view-point image when the virtual monitoring target is disposed within the blind spot region.

* * * * *